(12) United States Patent
Otsuki et al.

(10) Patent No.: US 7,969,111 B2
(45) Date of Patent: Jun. 28, 2011

(54) NUMERICAL CONTROLLER FOR CONTROLLING A FIVE-AXIS MACHINING APPARATUS

(75) Inventors: Toshiaki Otsuki, Yamanashi (JP); Takehiro Yamaguchi, Yamanashi (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 414 days.

(21) Appl. No.: 12/258,733

(22) Filed: Oct. 27, 2008

(65) Prior Publication Data

US 2009/0140684 A1    Jun. 4, 2009

(30) Foreign Application Priority Data

Nov. 30, 2007  (JP) ................................. 2007-310195
Oct. 23, 2008  (JP) ................................. 2008-273091

(51) Int. Cl.
*G05B 19/404* (2006.01)
(52) U.S. Cl. .................. 318/572; 318/571; 318/568.12; 451/5; 451/8; 700/186; 700/193
(58) Field of Classification Search .................. 318/571, 318/572, 568.12; 451/5, 8; 700/186, 193
See application file for complete search history.

(56) References Cited

U.S. PATENT DOCUMENTS

| | | | | |
|---|---|---|---|---|
| 4,310,878 A | * | 1/1982 | Hyatt | 700/78 |
| 4,370,720 A | * | 1/1983 | Hyatt | 700/194 |
| 4,396,976 A | * | 8/1983 | Hyatt | 700/1 |
| 4,445,776 A | * | 5/1984 | Hyatt | 355/78 |
| RE33,910 E | * | 5/1992 | Compton | 82/18 |
| 5,406,494 A | * | 4/1995 | Schuett | 700/188 |
| 5,492,440 A | * | 2/1996 | Spaan et al. | 409/80 |
| 6,352,496 B1 | * | 3/2002 | Oldani | 483/55 |
| 7,283,889 B2 | | 10/2007 | Otsuki et al. | |
| 2002/0049514 A1 | * | 4/2002 | Puchtler | 700/245 |
| 2005/0230557 A1 | * | 10/2005 | Aghili | 244/158.1 |
| 2006/0136088 A1 | | 6/2006 | Sato et al. | |
| 2009/0118864 A1 | * | 5/2009 | Eldridge et al. | 700/259 |

FOREIGN PATENT DOCUMENTS

| | | |
|---|---|---|
| JP | 7-98607 | 4/1995 |
| JP | 10-20912 | 1/1998 |
| JP | 3174704 | 3/2001 |
| JP | 2004-272887 | 9/2004 |
| JP | 2005-59102 | 3/2005 |
| JP | 2006-155530 | 6/2006 |
| JP | 2007-168013 | 7/2007 |

OTHER PUBLICATIONS

Japanese Notice of Reasons for Rejection mailed Mar. 17, 2009 issued in Japanese Application No. 2008-273091.

* cited by examiner

*Primary Examiner* — Paul Ip
(74) *Attorney, Agent, or Firm* — Drinker Biddle & Reath LLP

(57) ABSTRACT

A numerical controller capable of moving a tool end point position to an accurate position in a five-axis machining apparatus. Compensation amounts are set, which correspond to respective ones of a linear axis-dependent translational error, a rotary axis-dependent translational error, a linear axis-dependent rotational error, and a rotary axis-dependent rotational error, which are produced in the five-axis machining apparatus. A translational/rotational compensation amount Δ3D is determined from these compensation amounts and added to a command linear axis position Pm. As the compensation amounts, there is used a corresponding one of six-dimensional lattice point compensation vectors, which are determined in advance as errors due to the use of a mechanical system and measured at lattice points of lattices into which the entire machine movable region is divided.

19 Claims, 17 Drawing Sheets

NUMERICAL CONTROLLER FOR CONTROLLING A FIVE-AXIS MACHINING APPARATUS

RELATED APPLICATIONS DATA

This application claims priority under 35 U.S.C. §119 and/or §365 to Japanese Application No. 2007-310195 filed Nov. 30, 2007, and Japanese Application No. 2008-273091 filed on Oct. 23, 2008, the entire contents of each of these applications are incorporated herein by reference.

BACKGROUND OF THE INVENTION

1. Field of the Invention

The present invention relates to a numerical controller for controlling a five-axis machining apparatus having three linear axes and two rotary axes, and more particular, to a numerical controller for performing control to realize highly accurate machining by setting compensation amounts corresponding to errors, such as linear axis-dependent and rotary axis-dependent translational errors which are respectively dependent on linear and rotary axis positions, thereby moving a tool end point position to an accurate position.

2. Description of Related Art

JP3174704B discloses a technique in which a coordinate system is divided into lattice regions, lattice point compensation vectors measured at lattice points are stored, and a current position compensation vector for use in compensation is calculated based on lattice point compensation vectors. This disclosed technique implements only linear axis-dependent translational compensation, and therefore cannot carry out linear axis-dependent rotational compensation, rotary axis-dependent rotational compensation, and rotary axis-dependent translational compensation.

JP2005-59102A discloses a technique for correcting the machining origin based on a rotary axis error with respect to a reference axis. This disclosed technique only implements rotary axis-dependent translational compensation, and cannot carry out linear axis-dependent translational compensation, linear axis-dependent rotational compensation, and rotary axis-dependent rotational compensation.

JP2004-272887A discloses a compensation technique for maintaining a relation between a tool and a workpiece found when there is no mechanical error on the basis of an amount of misalignment of a rotary axis and an amount of misalignment of the turning center of the spindle. This disclosed technique only takes into account the amount of misalignment of the rotary axis and that of the turning center of the spindle, thus entailing a difficulty in realizing accurate compensation. This patent publication does not disclose a technique for storing in advance compensation amounts at division positions in each axis coordinate system and determining a compensation amount for a command position based on stored compensation amounts.

JP2007-168013A discloses a technique for calculating the position of a cutting edge of a tool being used on the basis of a rotary axis position (index angle of inclined feed axis), a tool length (distance from a front end surface of the tool spindle to the cutting edge being used), measured distances from the front end surface to a plurality of reference points on a test bar, and measured positions of the reference points. With this technique, only rotary axis-dependent rotational compensation is performed through three linear axes and two rotary axes for head rotation in a five-axis machining apparatus, and therefore, linear axis-dependent translational compensation, linear axis-dependent rotational compensation, and rotary axis-dependent translational compensation are difficult to carry out.

The five-axis machining apparatus for machining a workpiece through three linear axes and two rotary axes produces four primary errors including translational errors, (1) a linear axis-dependent translational error which is dependent on linear axis position and (2) a rotary axis-dependent translational error which is dependent on rotary axis position, and rotational errors, (3) a linear axis-dependent rotational error which is dependent on linear axis position and (4) a rotary axis-dependent rotational error which is dependent on rotary axis position.

SUMMARY OF THE INVENTION

According to the present invention, compensation amounts corresponding to the above described four errors are set, and a translational/rotational compensation amount is determined from these compensation amounts and added to a command linear axis position, whereby this invention provides a numerical controller for controlling a five-axis machining apparatus, which is capable of moving a tool end point position to an accurate position to thereby realize highly accurate machining.

The present invention provides a numerical controller for a five-axis machining apparatus, which is capable of separately setting a linear axis-dependent rotational compensation amount, a linear axis-dependent translational compensation amount, a rotary axis-dependent rotational compensation amount, and a rotary axis-dependent translational compensation amount, and capable of measuring an error while independently moving the linear axes and the rotary axes, and setting a compensation amount.

A numerical controller of the present invention controls a five-axis machining apparatus which is provided with three linear axes and two rotary axes for moving a tool relative to a workpiece mounted on a table, according to commands of a machining program. The numerical controller comprises: axis-dependent compensation amount calculating means that calculates an axis-dependent translational compensation amount and an axis-dependent rotational compensation amount for a command axis position; translational/rotational compensation amount calculating means that calculates a translational/rotational compensation amount based on the axis-dependent translational compensation amount and the axis-dependent rotational compensation amount; compensation amount adding means that adds the calculated translational/rotational compensation amount to the command linear-axis position to obtain a compensated linear-axis position; and means that drives the three linear axes to the compensated linear-axis position and drives the two rotary axes to command positions.

The axis-dependent compensation amount calculating means may calculate a rotary axis-dependent translational compensation amount and a rotary axis-dependent rotational compensation amount for a command rotary-axis position, and the translational/rotational compensation amount calculating means may calculate the translational/rotational compensation amount based on the rotary axis-dependent translational compensation amount and the rotary axis-dependent rotational compensation amount.

The axis-dependent compensation amount calculating means may calculate a linear axis-dependent translational compensation amount and a linear axis-dependent rotational compensation amount for a command linear-axis position, and the translational/rotational compensation amount calculating means may calculate the translational/rotational compensation amount based on the linear axis-dependent translational compensation amount and the linear axis-dependent rotational compensation amount.

The axis-dependent compensation amount calculating means may calculate a linear axis-dependent translational compensation amount and a linear axis-dependent rotational compensation amount for a command linear-axis position, and a rotary axis-dependent translational compensation amount and a rotary axis-dependent rotational compensation amount for a command rotary-axis position, and the translational/rotational compensation amount calculating means may calculate the translational/rotational compensation amount based on the linear axis-dependent translational compensation amount, the linear axis-dependent rotational compensation amount, the rotary axis-dependent translational compensation amount and the rotary axis-dependent rotational compensation amount.

The two rotary axes may be provided for rotating a machining head which supports the tool in the five-axis machining apparatus. In this case, the translational/rotational compensation amount may be calculated based on translational/rotational transformation of a tool length compensation vector.

The two rotary axes may be provided for rotating the table on which the workpiece is mounted in the five-axis machining apparatus. In this case, the translational/rotational compensation amount may be calculated based on translational/rotational transformation of a vector extending from a rotation center of the table to an end point of the tool.

The two rotary axes may comprise a first rotary axis for rotating a machining head which supports the tool, and a second rotary axis for rotating the table on which the workpiece is mounted. In this case, the translational/rotational compensation amount may be calculated based on translational/rotational transformation of a tool length compensation vector and translational/rotational transformation of a vector extending from a rotation center of the table to an end point of the tool.

The linear axis-dependent compensation amount calculating means may divide a three-dimensional coordinate system space defined by the three linear axes into lattice regions arranged at predetermined intervals in respective axis directions, store a lattice point compensation vector indicative of a rotational compensation amount and a translational compensation amount at each lattice point of the lattice regions, and calculate a linear axis-dependent rotational compensation amount and a linear axis-dependent translational compensation amount at a position on the three linear axes based on lattice point compensation vectors.

The rotary axis-dependent compensation amount calculating means may divide a two-dimensional coordinate system space defined by the two rotary axes into lattice regions arranged at predetermined intervals in respective axis directions, store a lattice point compensation vector indicative of a rotational compensation amount and a translational compensation amount at each lattice point of the lattice regions, and calculate a rotary axis-dependent rotational compensation amount and a rotary axis-dependent translational compensation amount at a position on the two rotary axes based on the lattice point compensation vectors.

The rotary axis-dependent compensation amount calculating means may divide a one-dimensional coordinate system space defined by one of the two rotary axes at predetermined intervals, store a division point compensation vector indicative of a rotational compensation amount and a translational compensation amount at each of division points arranged at the predetermined intervals; divide a one-dimensional coordinate system space defined by another of the two rotary axes at predetermined intervals, store a division point compensation vector indicative of a rotational compensation amount and a translational compensation amount at each of division points arranged at the predetermined intervals, and calculate rotary axis-dependent compensation amounts at respective positions on the two rotary axes based on the division point compensation vectors.

The linear axis-dependent compensation amount calculating means may divide a two-dimensional coordinate system space defined by two of the three linear axes into lattice regions arranged at predetermined intervals in respective axis directions, store a lattice point compensation vector indicative of a rotational compensation amount and a translational compensation amount at each lattice point of the lattice regions, calculate a linear axis-dependent rotational compensation amount and a linear axis-dependent translational compensation amounts at a position on the two linear axes based on the lattice point compensation vectors; divide a one-dimensional coordinate system space defined by a remaining one of the three linear axes at predetermined intervals, store a division point compensation vector indicative of a rotational compensation amount and a translational compensation amount at each of division points arranged at the predetermined intervals, and calculate a linear axis-dependent rotational compensation amount and a linear axis-dependent translational compensation amount at a position on the remaining one of the three linear axes based on the division point compensation vectors.

The linear axis-dependent compensation amount calculating means may divide each of one-dimensional coordinate system spaces defined by respective ones of the three linear axes at predetermined intervals, store a division point compensation vector indicative of a rotational compensation amount and a translational compensation amount at each of division points arranged at the predetermined intervals, and calculate linear axis-dependent compensation amounts at positions on the respective ones of the three linear axes based on the division point compensation vectors.

The lattice point compensation vectors and/or the division point compensation vectors may be determined based on actually measured positions and theoretical positions of measurement points using test bars or ball end mills having different lengths from each other.

The command axis position may be an interpolated one of an axis position of the three linear axes or an axis position of the two rotary axes respectively commanded by the machining program.

The command axis position may be an axis position of the three linear axes or an axis position of the two rotary axes respectively commanded by the machining program.

With the present invention, compensation amounts corresponding to respective ones of errors are set, a translational/rotational compensation amount is determined from the compensation amounts and added to a command linear axis position, and a tool end point position is moved to an accurate position, whereby highly accurate machining can be carried out.

With the present invention, the separation is performed into a linear axis-dependent rotational compensation amount, a linear axis-dependent translational compensation amount, a rotary axis-dependent rotational compensation amount, and a rotary axis-dependent translational compensation amount, whereby an error can be measured while independently moving linear axes and rotary axes, and a compensation amount can be set. In a five-axis machining apparatus having five axes which are concurrently operable, it is therefore possible to measure respective errors and set compensation amounts with ease.

With this invention, it is unnecessary for a five-axis machining apparatus to prepare a five-dimensional data table for use in measuring and setting compensation amounts corresponding to respective ones of positions on the five axes, and therefore, a memory region with a large amount of capacity is not used in a memory device of the numerical controller.

DETAILED DESCRIPTION

In the following, one embodiment of a numeral controller of this invention for controlling a five-axis machining apparatus will be described with reference to the appended drawings. Five-axis machining apparatuses are generally classified into three types, i.e., a tool head rotary type, a table rotary type, and a mixed type (in which both a tool head and a table are rotatable).

Figure 1:
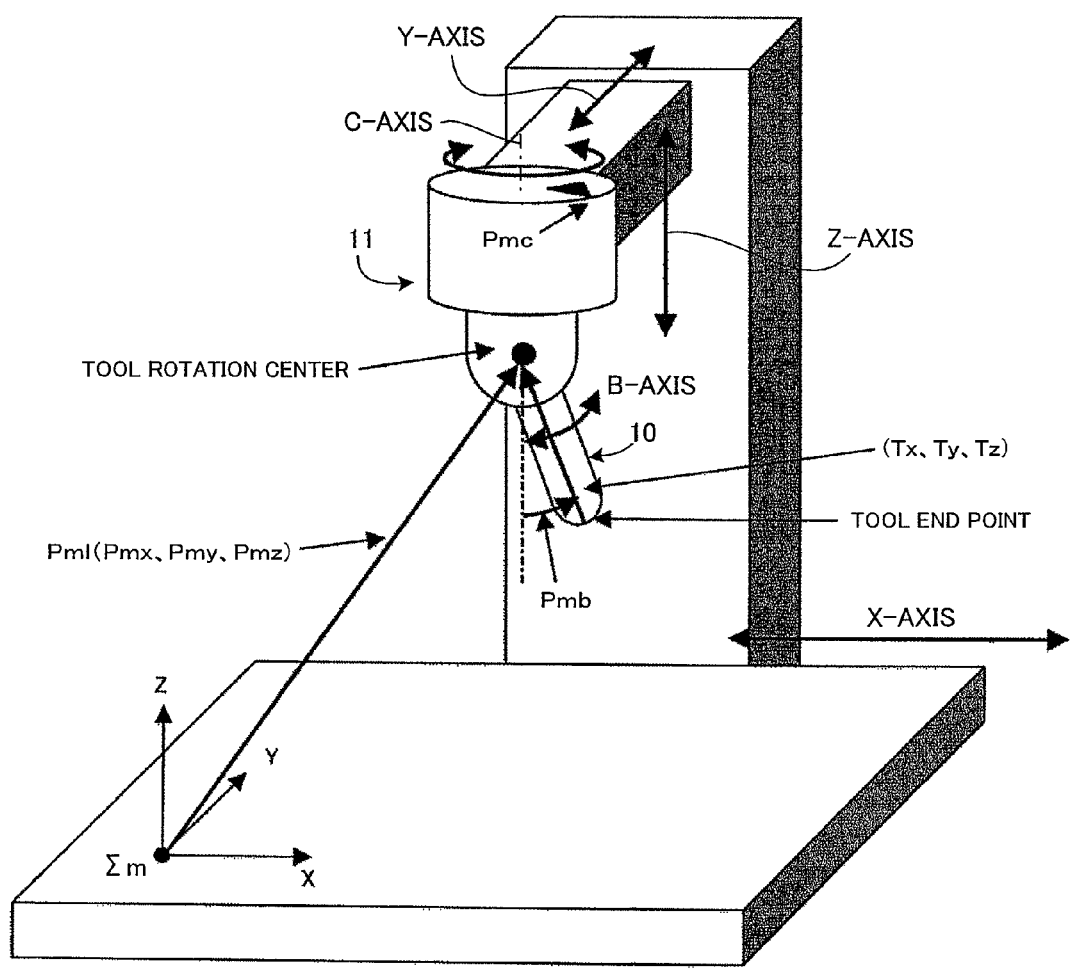
FIG. 1 is a conceptual view showing an embodiment of a five-axis machining apparatus of tool head rotary type.

FIG. 1 shows an exemplar five-axis machining apparatus controlled by a numerical controller of this invention. The example in FIG. 1 is a tool head rotary type in which a tool head 11 rotates.

Figure 2:
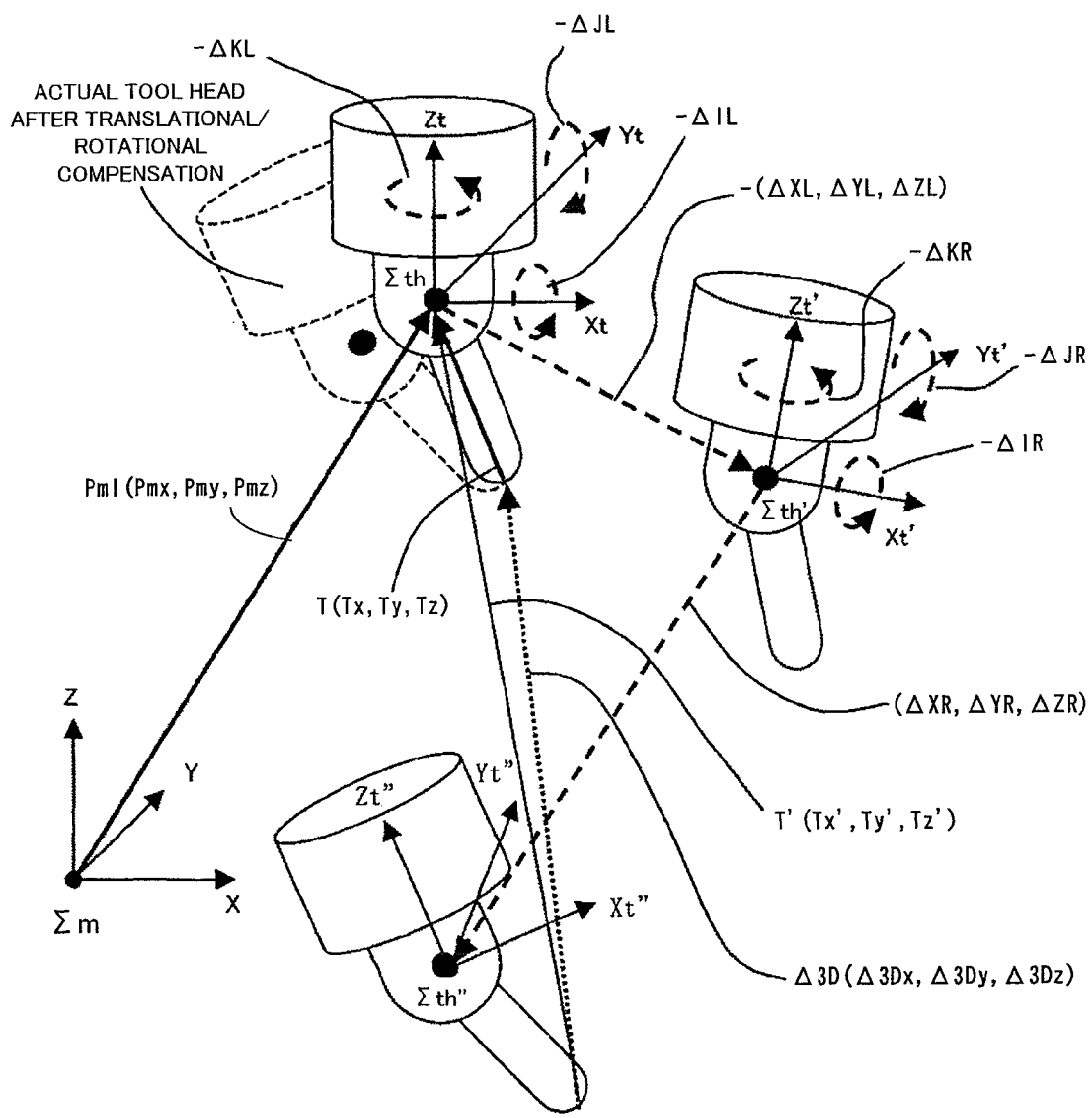
FIG. 2 is a view for explaining rotational errors, translational errors, and compensation of these errors in this invention.

Referring to FIG. 2, a description will be given of rotational errors, translational errors, and compensation of these errors in the tool head rotary type five-axis machining apparatus. There is shown a tool head coordinate system Sth (Xt, Yt, Zt) having an origin thereof coincident with a rotation center of a tool head 11. As illustrated, due to a linear axis-dependent translational error and a linear axis-dependent rotational error, the tool head coordinate system Sth is shifted to an coordinate system Sth' (Xt', Yt', Zt'), which is further shifted to an coordinate system Sth" (Xt", Yt", Zt") due to a rotary axis-dependent translational error and a rotary axis-dependent rotational error. Symbols $-\Delta In$, $-\Delta Jn$, and $-\Delta Kn$ (n=L or R) indicate the rotational error between corresponding two of the coordinate systems around the X-, Y-, and Z-axes. Symbols $-\Delta Xn$, $-\Delta Yn$, and $-\Delta Zn$ (n=L or R) denote the translational error between corresponding two of the coordinate systems in the X-axis, Y-axis, and Z-axis directions. These errors are small in amount, but are exaggerated in FIG. 2 for ease of understanding.

A linear axis-dependent translational compensation amount for a command linear axis position Pml(Pmx, Pmy, Pmz) which is commanded by a machining program in a machine coordinate system Sm is represented by $\Delta XL$, $\Delta YL$, and $\Delta ZL$, and a linear axis-dependent rotational compensation amount for the Pml is represented by $\Delta IL$, $\Delta JL$, and $\Delta KL$. A rotary axis-dependent translational compensation amount for a command rotary axis position Pmr(Pmb, Pmc) is represented by $\Delta XR$, $\Delta YR$, and $\Delta ZR$, and a rotary axis-dependent rotational compensation amount for the Pmr is represented by $\Delta IR$, $\Delta JR$, and $\Delta KR$. The above compensation amounts are referred to as axis-dependent translational compensation amounts and axis-dependent rotational compensation amounts. Since the errors and the compensation amounts are opposite to one another in positive and negative signs with respect to the rotary tool head, the errors are represented by the negatives of the compensation amounts in the drawings and the present specification.

As indicated by equation (1), a vector $-T'(-Tx', -Ty', -Tz')$, which is the inversion of an actual tool length compensation vector $T'(Tx', Ty', Tz')$, can be determined by multiplying a vector $-T(-Tx, -Ty, -Tz)$, which is the inversion of a tool length compensation vector $T(Tx, Ty, Tz)$, by transformation matrices corresponding to respective ones of the errors.

In equation (1), matrix elements $\Delta IL$, $\Delta JL$, $\Delta KL$, $\Delta IR$, $\Delta JR$, and $\Delta KR$ are in radian. If the rotational errors $-\Delta IL$, $-\Delta JL$, $-\Delta KL$, $-\Delta IR$, $-\Delta JR$, and $-\Delta KR$ have sufficiently small values, the following are satisfied: $SIN(-\Delta In)=-\Delta In$, $SIN(-\Delta Jn)=-\Delta Jn$, $SIN(-\Delta Kn)=-\Delta Kn$, $COS(-\Delta In)=1$, $COS(-\Delta Jn)=1$, $COS(-\Delta Kn)=1$, where n=L and R. Each matrix element in equation (1) can be represented by a power-series expansion of a trigonometric function, which is an approximation of the trigonometric function where the terms of the second and higher power of the error are neglected. It should be noted that trigonometric functions may be used in the transformation matrices instead of using approximations thereof.

$$\begin{bmatrix} -Tx' \\ -Ty' \\ -Tz' \\ 1 \end{bmatrix} = \begin{bmatrix} 1 & \Delta KL & -\Delta JL & -\Delta XL \\ -\Delta KL & 1 & \Delta IL & -\Delta YL \\ \Delta JL & -\Delta IL & 1 & -\Delta ZL \\ 0 & 0 & 0 & 1 \end{bmatrix} \begin{bmatrix} 1 & \Delta KR & -\Delta JR & -\Delta XR \\ -\Delta KR & 1 & \Delta IR & -\Delta YR \\ \Delta JR & -\Delta IR & 1 & -\Delta ZR \\ 0 & 0 & 0 & 1 \end{bmatrix} \begin{bmatrix} -Tx \\ -Ty \\ -Tz \\ 1 \end{bmatrix} \quad (1)$$

From equation (1), equation (2) can be derived, in which the terms of the second power of the error in the product of the transformation matrices are neglected.

$$\begin{bmatrix} -Tx' \\ -Ty' \\ -Tz' \\ 1 \end{bmatrix} = \begin{bmatrix} 1 & \Delta KL + \Delta KR & -\Delta JR - \Delta JR & -\Delta XL - \Delta XR \\ -\Delta KL - \Delta KR & 1 & \Delta IL + \Delta IR & -\Delta YL - \Delta YR \\ -\Delta JL + \Delta JR & -\Delta IL - \Delta IR & 1 & -\Delta ZL - \Delta ZR \\ 0 & 0 & 0 & 1 \end{bmatrix} \begin{bmatrix} -Tx \\ -Ty \\ -Tz \\ 1 \end{bmatrix} \quad (2)$$

There is a case where the rotary axis-dependent translational compensation amount ($\Delta XR$, $\Delta YR$, $\Delta ZR$) and the rotary axis-dependent rotational compensation amount ($\Delta IR$, $\Delta JR$, $\Delta KR$) for the command rotary axis position Pmr are more significant than the linear axis-dependent translational compensation amount ($\Delta XL$, $\Delta YL$, $\Delta ZL$) and the linear axis-dependent rotational compensation amount ($\Delta IL$, $\Delta JL$, $\Delta KL$) for the command linear axis position Pml, and the linear axis-dependent translational compensation amount ($\Delta XL$, $\Delta YL$, $\Delta ZL$) and the linear axis-dependent rotational compensation amount ($\Delta IL$, $\Delta JL$, $\Delta KL$) are negligible. In such case, the following equation (1)' may be used in place of the equation (1). The equation (1)' is obtained by deleting the transformation matrix including ($\Delta XL$, $\Delta YL$, $\Delta ZL$) and ($\Delta IL$, $\Delta JL$, $\Delta KL$) on the right side of the equation (1).

$$\begin{bmatrix} -Tx' \\ -Ty' \\ -Tz' \\ 1 \end{bmatrix} = \begin{bmatrix} 1 & \Delta KR & -\Delta JR & -\Delta XR \\ -\Delta KR & 1 & \Delta IR & -\Delta YR \\ \Delta JR & -\Delta IR & 1 & -\Delta ZR \\ 0 & 0 & 0 & 1 \end{bmatrix} \begin{bmatrix} -Tx \\ -Ty \\ -Tz \\ 1 \end{bmatrix} \quad (1)'$$

Further, there is a case where the linear axis-dependent translational compensation amount ($\Delta XL$, $\Delta YL$, $\Delta ZL$) and the linear axis-dependent rotational compensation amount ($\Delta IL$, $\Delta JL$, $\Delta KL$) for the command linear axis position Pml are more significant than the rotary axis-dependent translational compensation amount ($\Delta XR$, $\Delta YR$, $\Delta ZR$) and the rotary axis-dependent rotational compensation amount ($\Delta IR$, $\Delta JR$, $\Delta KR$) for the command rotary axis position Pmr, and the rotary axis-dependent translational compensation amount ($\Delta XR$, $\Delta YR$, $\Delta ZR$) and the rotary axis-dependent rotational compensation amount ($\Delta IR$, $\Delta JR$, $\Delta KR$) are negligible. In such case, the following equation (1)" may be used in place of the equation (1). The equation (1)" is obtained by deleting the transformation matrix including ($\Delta XR$, $\Delta YR$, $\Delta ZR$) and ($\Delta IR$, $\Delta JR$, $\Delta KR$) on the right side of the equation (1).

$$\begin{bmatrix} -Tx' \\ -Ty' \\ -Tz' \\ 1 \end{bmatrix} = \begin{bmatrix} 1 & \Delta KL & -\Delta JL & -\Delta XL \\ -\Delta KL & 1 & \Delta IL & -\Delta YL \\ \Delta JL & -\Delta IL & 1 & -\Delta ZL \\ 0 & 0 & 0 & 1 \end{bmatrix} \begin{bmatrix} -Tx \\ -Ty \\ -Tz \\ 1 \end{bmatrix} \quad (1)''$$

Based on the tool length compensation vector T(Tx, Ty, Tz) and the actual tool length compensation vector T'(Tx', Ty', Tz') derived from equation (1) or (2), a translational/rotational compensation amount $\Delta 3D$ ($\Delta 3Dx$, $\Delta 3Dy$, $\Delta 3Dz$) for use in correcting the tool end point to an accurate position is calculated in accordance with equation (3).

$$\begin{bmatrix} \Delta 3Dx \\ \Delta 3Dy \\ \Delta 3Dz \end{bmatrix} = \begin{bmatrix} Tx' - Tx \\ Ty' - Ty \\ Tz' - Tz \end{bmatrix} \quad (3)$$

The translational/rotational compensation amount $\Delta 3D$ ($\Delta 3Dx$, $\Delta 3Dy$, $\Delta 3Dz$) thus obtained is added to the command linear axis position Pml(Pmx, Pmy, Pmz) to thereby determine a modified linear axis position Pml'(Pmx', Pmy', Pmz'). The linear X-, Y- and Z-axes are driven to attain the modified linear axis position Pml'(Pmx', Pmy', Pmz'), and the rotary B- and C-axes are driven to attain the command position, whereby the tool end point position can be moved to the accurate position.

Specifically, when the command linear axis position Pml (Pmx, Pmy, Pmz) is given, the tool head position is normally at a coordinate position (Xt, Yt, Zt), but, due to errors, is actually at a coordinate position (Xt", Yt", Zt"). Thus, compensation is performed using the translational/rotational compensation amount $\Delta 3D$ ($\Delta 3Dx$, $\Delta 3Dy$, $\Delta 3Dz$) to place the tool head at a position indicated by dotted line in FIG. 2. As a result, the tool end point position can be moved to the accurate position.

Next, a description will be given of how compensation amounts are set and calculated.

The following is a description of an example to determine the linear axis-dependent translational compensation amount ($\Delta XL$, $\Delta YL$, $\Delta ZL$) and linear axis-dependent rotational compensation amount ($\Delta IL$, $\Delta JL$, $\Delta KL$) for the command linear axis position Pml(Pmx, Pmy, Pmz) and the rotary axis-dependent translational compensation amount ($\Delta XR$, $\Delta YR$, $\Delta ZR$) and rotary axis-dependent rotational compensation amounts ($\Delta IR$, $\Delta JR$, $\Delta KR$) for the command rotary axis position Pmr (Pmb, Pmc).

First, a description will be given of a method for determining the linear axis-dependent translational and rotational compensation amounts ($\Delta XL$, $\Delta YL$, $\Delta ZL$), ($\Delta IL$, $\Delta JL$, $\Delta KL$) for the command linear axis position Pml(Pmx, Pmy, Pmz).

Figure 3:
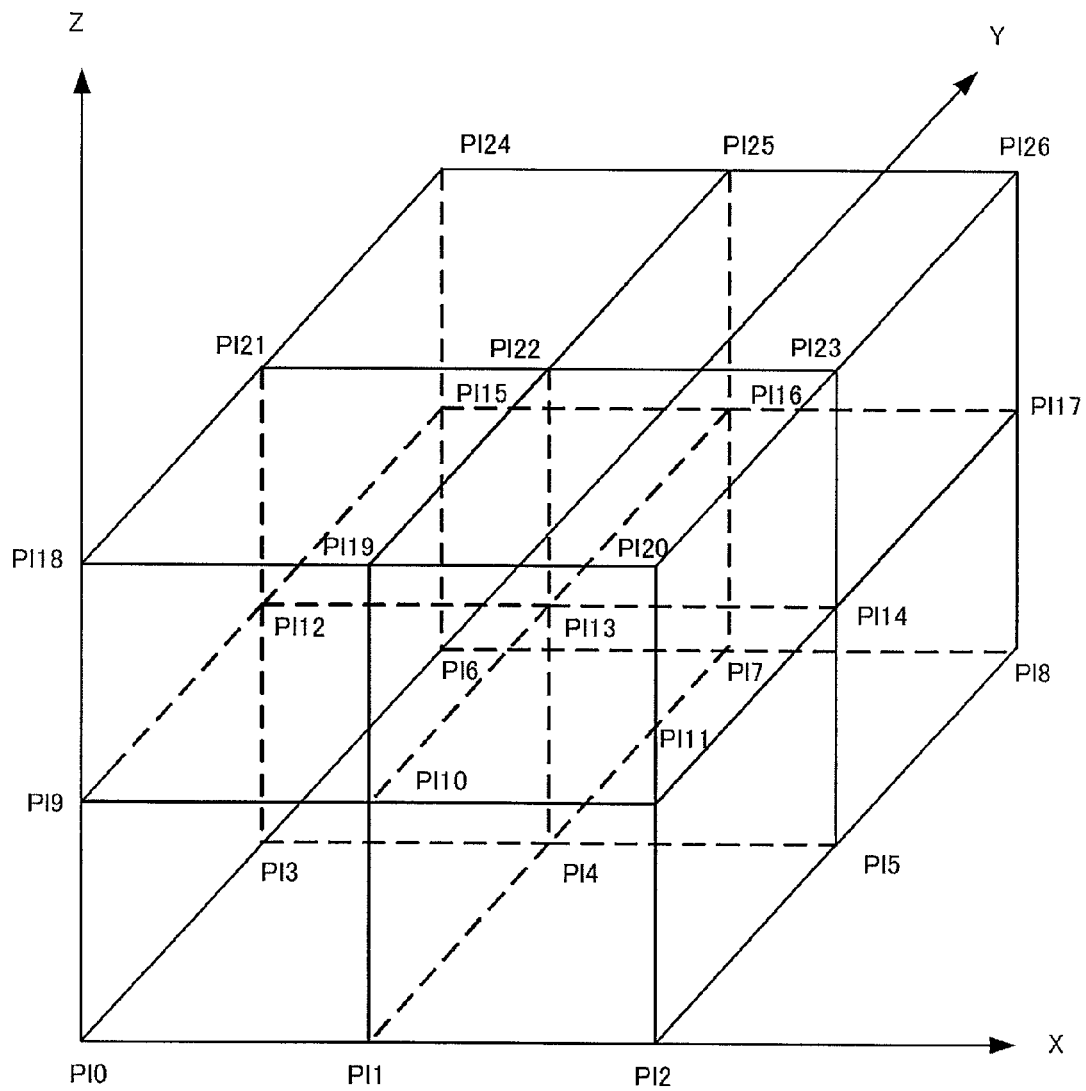
FIG. 3 is a view showing a three-dimensional coordinate system divided into lattice regions.

FIG. 3 shows a three-dimensional coordinate system divided into lattice regions. The three-dimensional coordinate system is divided into lattices arranged at equal intervals. Lattice division lines cross one another at lattice points P10 to P126. It should be noted that a part of the coordinate system is shown in FIG. 3. Actually, the entire region in which the machine is movable is divided into lattices. The lattice intervals do not have to be constant. For instance, the lattice positions on the respective axes such as X-axis positions of the lattice points P10, P11, P12 on the X-axis, Y-axis positions of the lattice points P10, P13, P16 on the Y-axis and Z-axis positions of the lattice points P10, P19, P118 on the Z-axis may be individually set by set values.

An error (translational and rotational errors) due to the use of a mechanical system is measured in advance at each lattice point. An exemplar measurement method will be described later. As a lattice point compensation vector, there is used a vector which is equal in absolute value to but opposite in direction from the error at each lattice point produced due to the mechanical system. Thus, the compensation amount is represented by a six-dimensional vector Un(UnX, UnY, UnZ, UnI, UnJ, UnK), where n=0 to 26. The vector components UnX, UnY, and UnZ correspond to the linear axis-dependent translational compensation amount ($\Delta$XL, $\Delta$YL, $\Delta$ZL), and the vector components UnI, UnJ, and UnK correspond to the linear axis-dependent rotational compensation amount ($\Delta$IL, $\Delta$JL, $\Delta$KL). The lattice point compensation vectors are stored in the form of a linear axis-dependent compensation amount table into a nonvolatile memory or the like, which is incorporated in the numerical controller. If the coordinate system is excessively finely divided into lattices, an amount of data of the lattice point compensation vectors becomes large, thus requiring the memory with a large storage capacity. The lattice points required for calculation of compensation amount while suppressing the data amount are about several tens in number per axis.

The following is a description of a method for calculating the linear axis-dependent translational compensation amount ($\Delta$XL, $\Delta$YL, $\Delta$ZL) and linear axis-dependent rotational compensation amount ($\Delta$IL, $\Delta$JL, $\Delta$KL) for a given command linear axis position Pml(Pmx, Pmy, Pmz).

Figure 4:
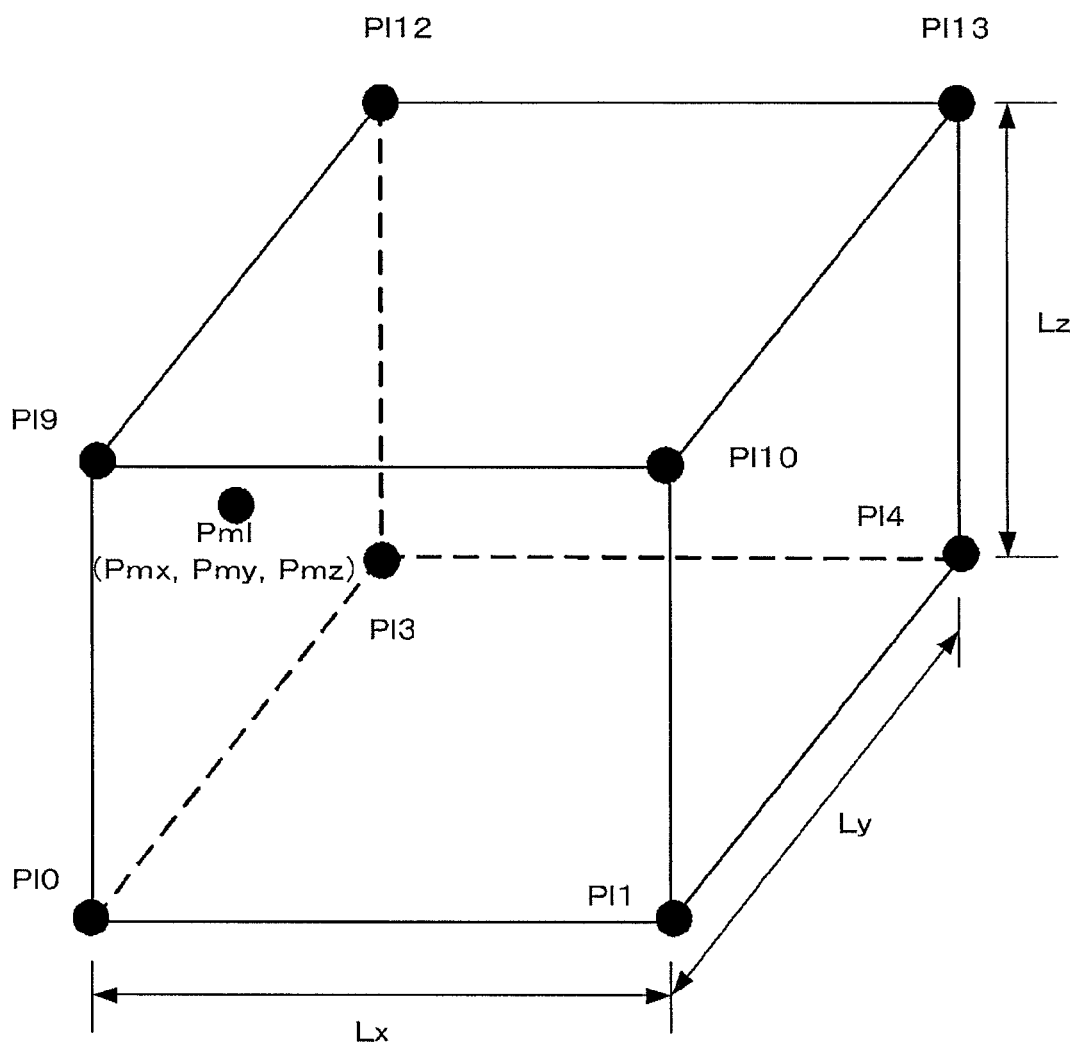
FIG. 4 is a view showing a lattice region including a command linear axis position Pml (Pmx, Pmy, Pmz) for which a compensation amount vector should be calculated.

FIG. 4 shows a lattice region including a command linear axis position Pml(Pmx, Pmy, Pmz) for which a compensation vector should be calculated. In this example, the command linear axis position Pml(Pmx, Pmy, Pmz) for which a compensation vector should be calculated is in a region surrounded by lattice points P10, P11, P13, P14, P19, P110, P112, and P113.

Symbols Lx, Ly, and Lz represent respective ones of the lattice intervals along the X-, Y-, and Z-axes. At each of the lattice points P10, P11, P13, P14, P19, P110, P112, and P113, there is set a corresponding one of lattice point compensation vectors U0(U0X, U0Y, U0Z, U0I, U0J, U0K) to U13(U13X, U13Y, U13Z, U13I, U13J, U13K). In the following, it is assumed that this lattice region is a linear vector field in which lattice point compensation vectors corresponding to respective ones of the lattice points are given at lattice point positions.

The lattice region including the point Pml(Pmx, my, mz) is determined, and the lattice point P10(P10x, P10y, P10z) is determined as a reference point. To determine a compensation vector for the point Pml, the position in the lattice is first normalized between [0, 1]. The normalized coordinate values (x, y, z) of the point Pml are determined in accordance with equations (4) to (6) in which symbols Lx, Ly, and Lz respectively represent the lattice intervals along the X-, Y-, and Z-axes.

$$x=(Pmx-P_{10x})/L_X \quad (4)$$

$$y=(Pmy-P_{10y})/L_y \quad (5)$$

$$z=(Pmz-P_{10z})/L_z \quad (6)$$

Based on the coordinate values (x, y, z), the compensation amount vector $\Delta$Lc($\Delta$XL, $\Delta$YL, $\Delta$ZL, $\Delta$IL, $\Delta$JL, $\Delta$KL) for the point Pml is calculated in accordance with equation (7).

$$\Delta aL = U0a \cdot (1-x)(1-y)(1-z) + U1a \cdot x(1-y)(1-z) + \quad (7)$$
$$U4a \cdot xy(1-z) + U3a \cdot (1-x)y(1-z) + U9 \cdot (1-x)(1-y)z +$$
$$U10a \cdot x(1-y)z + U13a \cdot xyz + U12a \cdot (1-x)yz$$

$(a = X, Y, Z, I, J, K)$

As described above, the linear axis-dependent translational compensation amount ($\Delta$XL, $\Delta$YL, $\Delta$ZL) and the linear axis-dependent rotational compensation amount ($\Delta$IL, $\Delta$JL, $\Delta$KL) for the given point Pml(Pmx, Pmy, Pmz) on the linear axis coordinate system can be calculated.

In the above, the three-dimensional coordinate system is divided into lattices as shown in FIG. 3, and the compensation amount vector at the position of the point Pml on the three linear axes is determined based on the lattice point compensation vectors at the lattice points arranged to surround the point Pml. Alternatively, with a combination of the below-described two-dimensional coordinate system and one-dimensional coordinate system, a compensation amount vector at a position of the point Pml on two linear axes and a compensation amount vector at a position of the point Pml on the remaining one linear axis may be determined. Further alternatively, with a combination of one-dimensional coordinate systems, a compensation amount vector at a position of the point Pml on a one-dimensional coordinate system, a compensation amount vector at a position of the point Pml on another one-dimensional coordinate system, and a compensation amount vector at a position of the point Pml on the remaining one-dimensional coordinate system may be determined.

Next, a description will be given of a method for determining a rotary axis-dependent translational compensation amount ($\Delta$XR, $\Delta$YR, $\Delta$ZR) and a rotary axis-dependent rotational compensation amount ($\Delta$IR, $\Delta$JR, $\Delta$KR) for a command rotary axis position Pmr(Pmb, Pmc).

Figure 5:
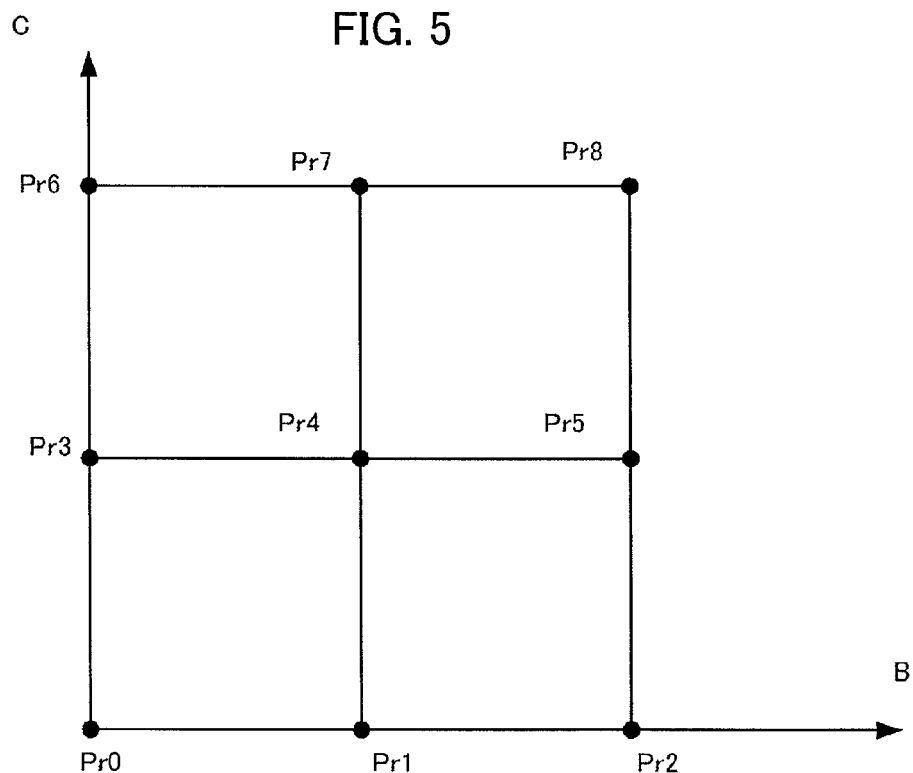
FIG. 5 is a view showing a two-dimensional coordinate system divided into lattice regions.

FIG. 5 shows a two-dimensional coordinate system divided into lattice regions. The two-dimensional coordinate system is divided into lattices at equal intervals. Symbols Pr0 to Pr8 denote lattice points at which lattice division lines cross one another. It should be noted that a part of the coordinate system is shown in FIG. 5. Actually, the entire region in which the machine is movable is divided into lattices. The lattice intervals do not have to be constant as mentioned with regard to FIG. 3. For instance, the lattice positions on the respective axes such as B-axis positions of the lattice points Pr0, Pr1, Pr2 on the B-axis and C-axis positions of the lattice points Pr0, Pr3, Pr6 on the C-axis may be individually set by set values.

An error (translational and rotational errors) due to the use of a mechanical system is measured in advance at each lattice point. An exemplar measurement method will be described later. As a lattice point compensation vector, there is used a vector which is equal in absolute value to but opposite in direction from the error at each lattice point produced due to the mechanical system. Thus, the compensation amount is represented by a six-dimensional vector Vn(VnX, VnY, VnZ, VnI, VnJ, VnK), where n=0 to 8. The vector components VnX, VnY, and VnZ correspond to the rotary axis-dependent translational compensation amount (ΔXR, ΔYR, ΔZR), and the vector components VnI, VnJ, and VnK correspond to the rotary axis-dependent rotational compensation amount (ΔIR, ΔJR, ΔKR). The lattice point compensation vectors are stored in the form of a rotary axis-dependent compensation amount table into a nonvolatile memory or the like. The following is a description of a method for calculating a rotary axis-dependent translational compensation amount (ΔXR, ΔYR, ΔZR) and a rotary axis-dependent rotational compensation amount (ΔIR, ΔJR, ΔKR) for a command rotary axis position Pmr (Pmb, Pmc).

Figure 6:
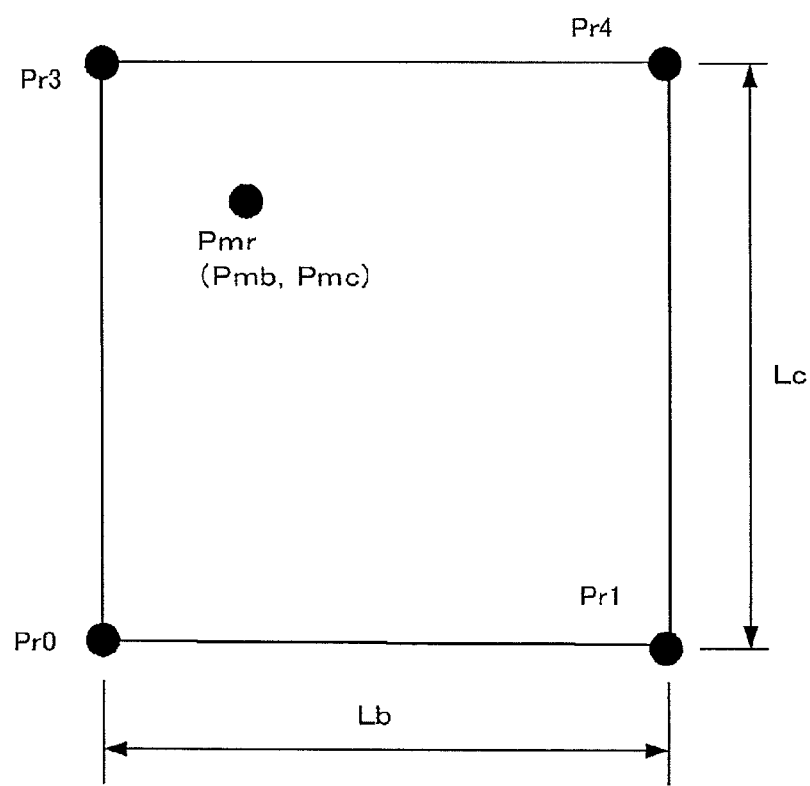
FIG. 6 is a view showing a lattice region including a command rotary axis position Pmr (Pmb, Pmc) for which a compensation vector should be calculated.

FIG. 6 shows a lattice region including a command rotary axis position Pmr (Pmb, Pmc) for which a compensation vector should be calculated. In this example, the command rotary position Pmr(Pmb, Pmc) for which a compensation vector should be calculated is in a region surrounded by lattice points Pr0, Pr1, Pr3, and Pr4.

At each of the lattice points Pr0, Pr1, Pr3, and Pr4, there is set a corresponding one of lattice point compensation vectors V0(V0X, V0Y, V0Z, V0I, V0J, V0K) to V4(V4X, V4Y, V4Z, V4I, V4J, V4K). In the following, it is assumed that this lattice region is a linear vector field in which lattice point compensation vectors respectively corresponding to the lattice points are given at lattice point positions.

The lattice region including the command rotary axis position Pmr(Pmb, Pmc) is determined, and the lattice point Pr0 (Prb, Prc) is determined as a reference point. To determine a compensation vector for the point Pmr, the position in the lattice is first normalized between [0, 1]. The normalized coordinate values (b, c) of the point Pmr are determined in accordance with equations (8) and (9) in which symbols Lb and Lc respectively represent the lattice intervals along the B- and C-axes.

$$b=(Pmb-Pr_b)/Lb \quad (8)$$

$$c=(Pmc-Pr_c)/Lc \quad (9)$$

Based on the coordinate values (b, c), the compensation amount vector ΔRc(ΔXR, ΔYR, ΔZR, ΔIR, ΔJR, ΔKR) for the point Pmr is calculated in accordance with equation (10).

$$\Delta aR = \quad (10)$$
$$V0a \cdot (1-b)(1-c) + V1a \cdot b(1-c) + V3a \cdot (1-b)c + V4a \cdot b \cdot c$$
$$(a = X, Y, Z, I, J, K)$$

As described above, the rotary axis-dependent translational compensation amount (ΔXR, ΔYR, ΔZR) and the rotary axis-dependent rotational compensation amount (ΔIR, ΔJR, ΔKR) for the given point Pmr(Pmb, Pmc) on the rotary axis coordinate system can be calculated. In the above, the two-dimensional coordinate system is divided into lattices as shown in FIG. 5, and the compensation amount vector at the position of the point Pmr on the two rotary axes is determined based on the lattice point compensation vectors at the lattice points arranged to surround the point Pmr. Alternatively, with a combination of the below-described one-dimensional coordinate systems, a compensation amount vector at a position of the point Pmr on one rotary axis and a compensation amount vector at a position of the point Pmr on the remaining one rotary axis may be determined.

Figure 7:
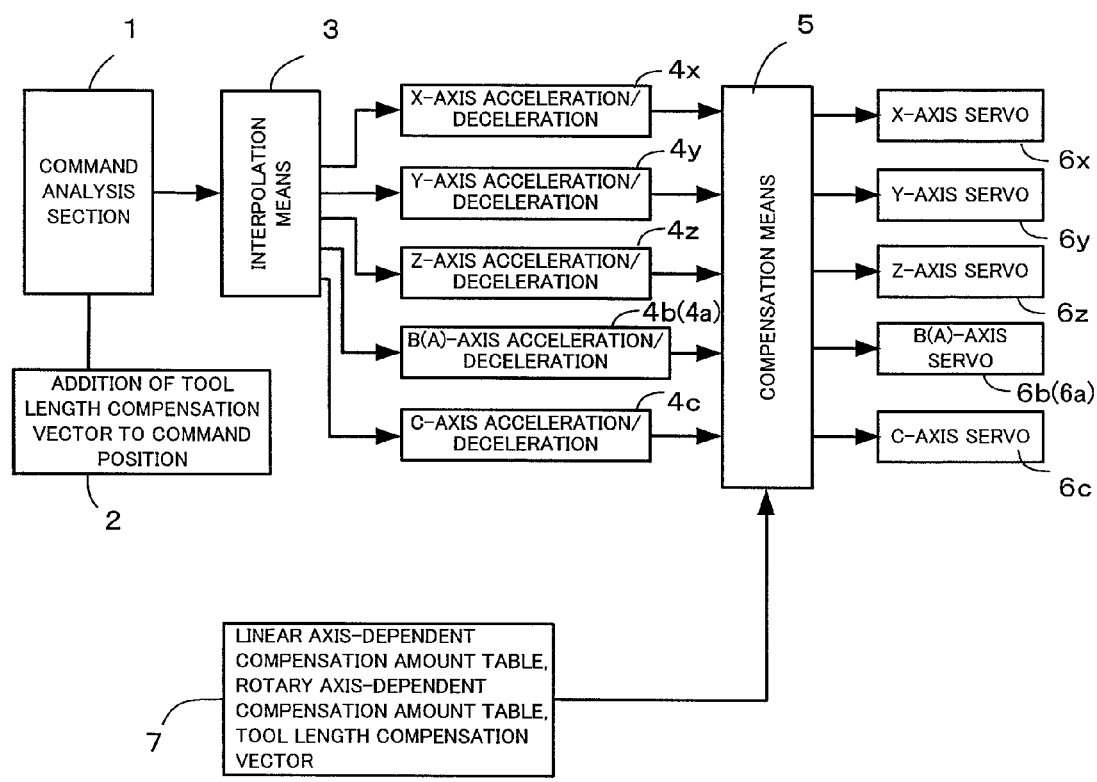
FIG. 7 is a block diagram showing an essential part of a first embodiment of a numerical controller of this invention that controls a five-axis machining apparatus.

FIG. 7 shows in block diagram an essential part of a first embodiment of a numerical controller of this invention that controls a five-axis machining apparatus. The numerical controller of the first embodiment is for handling a tool length compensation command. In the first embodiment, a command analysis section 1 analyzes each block of a program, and a tool length compensation vector element 2 adds a tool length compensation vector T(Tx, Ty, Tz) to a command tool end point position attained by the analysis, thereby determining a linear axis machine coordinate position to which the tool length compensation vector has been added.

Interpolation means 3 performs interpolation on the linear axis machine coordinate position and a command rotary axis rotary position to thereby generate a machine coordinate position on the respective axes. Acceleration/deceleration processing is implemented thereon by acceleration/deceleration processing units 4x, 4y, 4z, 4b(a), and 4c for the respective axes (X-, Y-, Z-, B- (or A-), and C-axes). Subsequently, compensation means 5 adds a translational/rotational compensation amount determined according to equations (1) to (3) to the acceleration/deceleration-processed command linear axis position Pml(Pmx, Pmy, Pmz), thereby determining a modified linear axis position Pml'(Pmx', Pmy', Pmz').

Then, servomotors 6x, 6y, 6z, 6b(a), 6c of the respective axes are driven to attain the modified linear axis position Pml'(Pmx', Pmy', Pmz') on the linear X-, Y- and Z-axes and attain the acceleration/deceleration-processed command rotary axis position on the rotary B- (or A-) and C-axes. In an input data unit 7, there are stored information on linear axis-dependent compensation amount, rotary axis-dependent compensation amount, and tool length compensation vector, which are used by the compensation means 5 to calculate the translational/rotational compensation amount in accordance with equations (1) to (3). It should be noted that information on the tool length compensation vector is obtained by the tool length compensation vector adding element 2.

Figure 8:
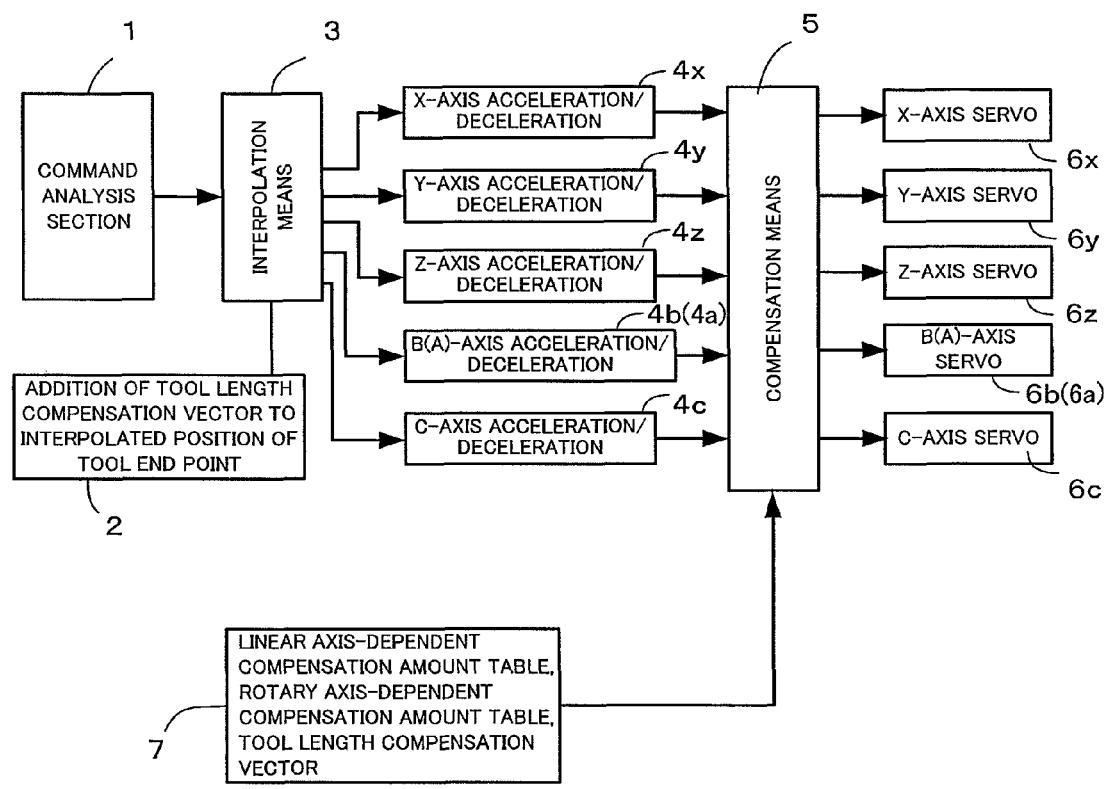
FIG. 8 is a block diagram showing an essential part of a second embodiment of the numerical controller of this invention that controls a five-axis machining apparatus.

FIG. 8 shows in block diagram an essential part of a second embodiment of the numerical controller of this invention that controls a five-axis machining apparatus. The numerical controller of the second embodiment is for performing tool end point control. In the second embodiment, the command analysis section 1 analyzes each block of a program, and the interpolation means 3 performs interpolation on a command position of the tool end point obtained by the analysis. The tool length compensation vector element 2 adds a tool length compensation vector T(Tx, Ty, Tz) to the interpolated position of the tool end point. A translational/rotational compensation amount determined by the compensation means 5 in accordance with equations (1) to (3) is added to a command linear axis position Pml(Pmx, Pmy, Pmz) acceleration/deceleration-processed by the acceleration/deceleration processing units for the respective axes, to thereby determine a modified linear axis position Pml'(Pmx', Pmy', Pmz').

Then, the servomotors 6x, 6y, 6z, 6b(a), 6c of the respective axes are driven to attain the modified linear axis position Pml'(Pmx', Pmy', Pmz') on the linear X-, Y-, and Z-axes and attain the acceleration/deceleration-processed command rotary axis position on the rotary B- (or A-) and C-axes. In the input data unit 7, there are stored information on linear axis-dependent compensation amount, rotary axis-dependent compensation amount, and tool length compensation vector, which are used by the compensation means 5 to calculate the translational/rotational compensation amount in accordance with equations (1) to (3). It should be noted that information on the tool length compensation vector is obtained by the tool length compensation vector adding element 2.

Figure 9:
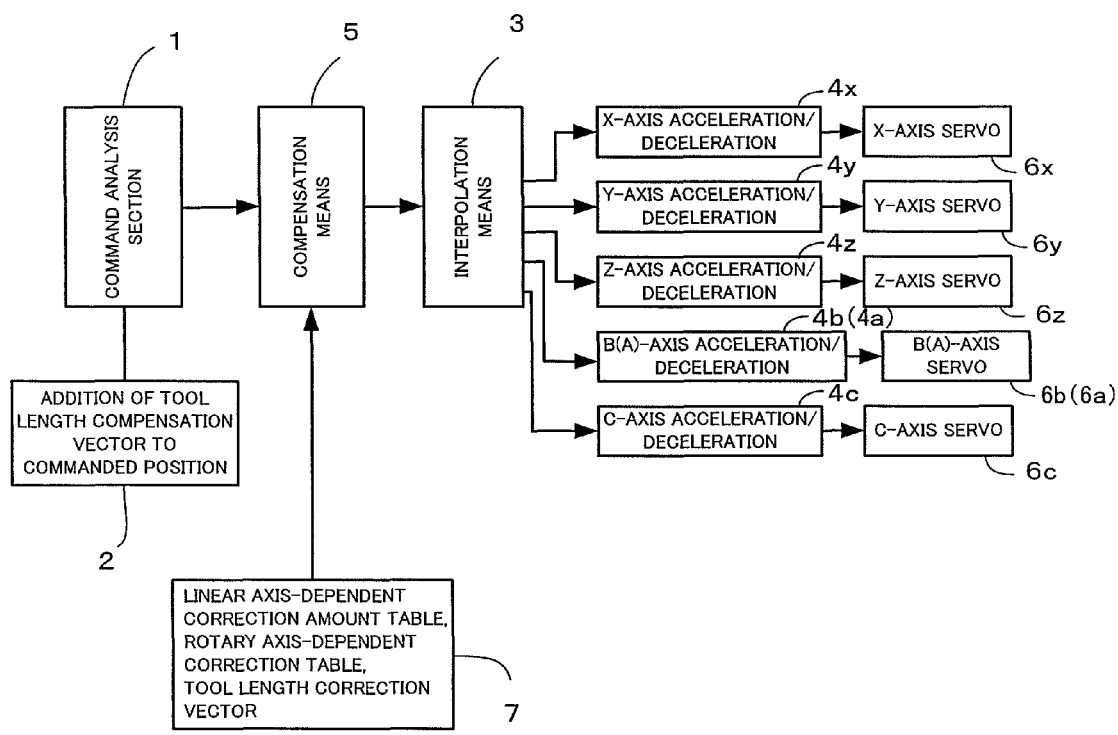
FIG. 9 is a block diagram showing an essential part of a third embodiment of the numerical controller of this invention that controls a five-axis machining apparatus.

FIG. 9 shows in block diagram an essential part of a third embodiment of the numerical controller of this invention that controls a five-axis machining apparatus. The numerical controller of the third embodiment is for handling a tool length compensation command. In the third embodiment, the command analysis section 1 analyzes each block of a program, and the tool length compensation vector element 2 adds a tool length compensation vector T(Tx, Ty, Tz) to a command tool end position attained by the analysis, thereby determining a command linear axis position Pml(Pmx, Pmy, Pmz) to which the tool length compensation vector has been added.

The compensation means 5 adds a translational/rotational compensation amount determined in accordance with equations (1) to (3) to the determined command linear axis position Pml(Pmx, Pmy, Pmz), thereby determining a modified linear axis position Pml'(Pmx', Pmy', Pmz'). The interpolation means 3 performs interpolation on the modified linear axis position and a command rotary axis position, and the acceleration/deceleration processing units 4x, 4y, 4z, 4b(a), 4c performs acceleration/deceleration processing on the interpolated position on the respective axes (X-, Y-, Z-, B- (or A-), and C-axes), and the servomotors 6x, 6y, 6z, 6b(a), and 6c for the respective axes are driven to attain the acceleration/deceleration-processed position on the respective axes.

Figure 10:
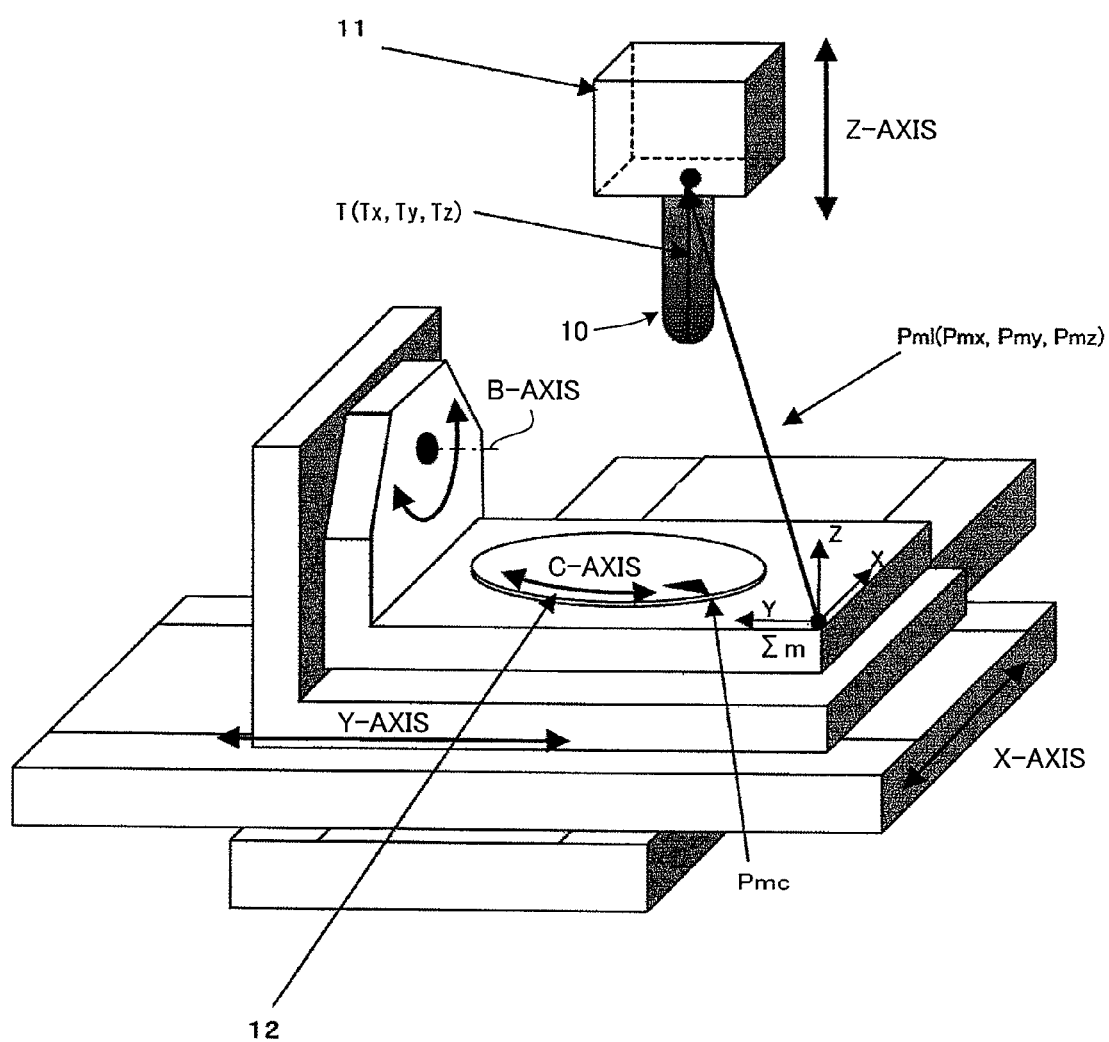
FIG. 10 is a conceptual view showing an example of a table rotary type machine.

FIG. 10 shows an example of a table rotary type machine. In the machine construction shown in FIG. 10, the table 12 is adapted to rotate with rotation of the C-axis and adapted to be tilted with rotation of the B-axis. The table 12 is linearly movable along the Y-axis, which is linearly movable along the X-axis. The tool head 11 is linearly movable along the Z-axis in the vertical direction.

X-axis, Y-axis, and Z-axis directions. These errors are small in amount, but are exaggerated for ease of understanding.

A linear axis-dependent translational compensation amount for a command linear axis position Pml(Pmx, Pmy, Pmz) is represented by ΔXL, ΔYL, and ΔZL, and a linear axis-dependent rotational compensation amount for the Pml is represented by ΔIL, ΔJL, and ΔKL. A rotary axis-dependent translational compensation amount for a command rotary axis position Pmr(Pmb, Pmc) is represented by ΔXR, ΔYR, and ΔZR, and a rotary axis-dependent rotational compensation amount for the Pmr is represented by ΔIR, ΔJR, and ΔKR. The above compensation amounts are referred to as axis-dependent translational compensation amounts and axis-dependent rotational compensation amounts. Since the errors and the compensation amounts are opposite to one another in positive and negative signs, the errors are represented by the negatives of compensation amounts in the drawings and the present specification.

As indicated by equation (11), an actual tool end point vector Tp'(Tpx', Tpy', Tpz') can be determined by multiplying a tool end point vector Tp (Tpx, Tpy, Tpz), which is a vector extending from the table rotation center to the tool end point, by transformation matrices corresponding to respective ones of the errors. Based on the table rotation center position Tac(Xac, Yac, Zac), the command linear axis position Pml, and the tool length compensation vector T, which are set separately, the tool end point vector Tp can be determined in accordance with a relation of Tp=Pml−T−Tac.

As in equation (1), matrix elements ΔIL, ΔJL, ΔKL, ΔIR, ΔJR, and ΔKR in equation (11) are in radian. A method for approximation is similar to that for equation (1).

$$\begin{bmatrix} Tpx' \\ Tpy' \\ Tpz' \\ 1 \end{bmatrix} = \begin{bmatrix} 1 & \Delta KL & -\Delta JL & -\Delta XL \\ -\Delta KL & 1 & \Delta IL & -\Delta YL \\ \Delta JL & -\Delta IL & 1 & -\Delta ZL \\ 0 & 0 & 0 & 1 \end{bmatrix} \begin{bmatrix} 1 & \Delta KR & -\Delta JR & -\Delta XR \\ -\Delta KR & 1 & \Delta IR & -\Delta YR \\ \Delta JR & -\Delta IR & 1 & -\Delta ZR \\ 0 & 0 & 0 & 1 \end{bmatrix} \begin{bmatrix} Tpx \\ Tpy \\ Tpz \\ 1 \end{bmatrix} \quad (11)$$

Figure 11:
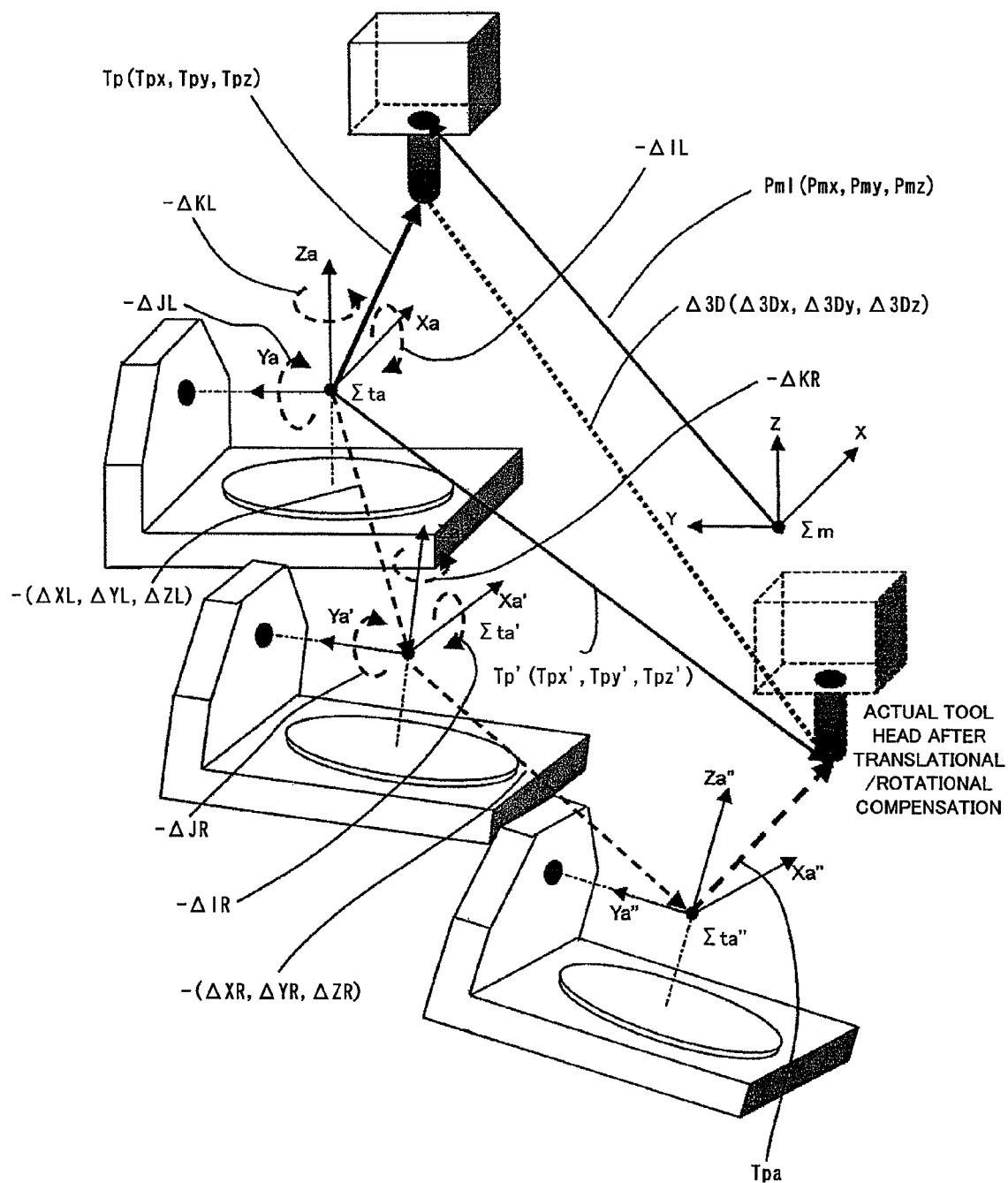
FIG. 11 is a view for explaining rotational and translational errors and compensation of these errors in this invention.

Next, with reference to FIG. 11, a description will be given of rotational and translational errors and compensation of these in the table rotary type five-axis machining apparatus.

From equation (11), equation (12) given below can be derived, in which the terms of the second power of the error in the product of the transformation matrices are neglected.

$$\begin{bmatrix} Tpx' \\ Tpy' \\ Tpz' \\ 1 \end{bmatrix} = \begin{bmatrix} 1 & \Delta KL + \Delta KR & -\Delta JL - \Delta JR & -\Delta XL - \Delta XR \\ -\Delta KL - \Delta KR & 1 & \Delta IL + \Delta IR & -\Delta YL - \Delta YR \\ \Delta JL + \Delta JR & -\Delta IL - \Delta IR & 1 & -\Delta ZL - \Delta ZR \\ 0 & 0 & 0 & 1 \end{bmatrix} \begin{bmatrix} Tpx \\ Tpy \\ Tpz \\ 1 \end{bmatrix} \quad (12)$$

There is shown a table coordinate system Sta (Xa, Ya, Za) having the origin thereof coincident with the table rotation center. As illustrated, due to a linear axis-dependent translational error and a linear axis-dependent rotational error, the table coordinate system Sta is shifted to a coordinate system Sta' (Xa', Ya', Za'), which is further shifted to a coordinate system Sta" (Xa", Ya", Za") due to a rotary axis-dependent translational error and a rotary axis-dependent rotational error. Symbols −ΔIn, −ΔJn, and −ΔKn (n=L or R) indicate the rotational error between corresponding two of the coordinate systems around the X-, Y-, and Z-axes. Symbols −ΔXn, −ΔYn, and −ΔZn (n=L or R) denote the translational error between corresponding two of the coordinate systems in the There is a case where the rotary axis-dependent translational compensation amount (ΔXR, ΔYR, ΔZR) and the rotary axis-dependent rotational compensation amount (ΔIR, ΔJR, ΔKR) for the command rotary axis position Pmr are more significant than the linear axis-dependent translational compensation amount (ΔXL, ΔYL, ΔZL) and the linear axis-dependent rotational compensation amount (ΔIL, ΔJL, ΔKL) for the command linear axis position Pml, and the linear axis-dependent translational compensation amount (ΔXL, ΔYL, ΔZL) and the linear axis-dependent rotational compensation amount (ΔIL, ΔJL, ΔKL) are negligible. In such case, the following equation (11)' may be used in place of the equation (11). The equation (11)' is obtained by deleting the transformation matrix including (ΔXL, ΔYL, ΔZL) and (ΔIL, ΔJL, ΔKL) on the right side of the equation (11).

$$\begin{bmatrix} Tpx' \\ Tpy' \\ Tpz' \\ 1 \end{bmatrix} = \begin{bmatrix} 1 & \Delta KR & -\Delta JR & -\Delta XR \\ -\Delta KR & 1 & \Delta IR & -\Delta YR \\ \Delta JR & -\Delta IR & 1 & -\Delta ZR \\ 0 & 0 & 0 & 1 \end{bmatrix} \begin{bmatrix} Tpx \\ Tpy \\ Tpz \\ 1 \end{bmatrix} \quad (11)'$$

Further, there is a case where the linear axis-dependent translational compensation amount (ΔXL, ΔYL, ΔZL) and the linear axis-dependent rotational compensation amount (ΔIL, ΔJL, ΔKL) for the command linear axis position Pml are more significant than the rotary axis-dependent translational compensation amount (ΔXR, ΔYR, ΔZR) and the rotary axis-dependent rotational compensation amount (ΔIR, ΔJR, ΔKR) for the command rotary axis position Pmr, and the rotary axis-dependent translational compensation amount (ΔXR, ΔYR, ΔZR) and the rotary axis-dependent rotational compensation amount (ΔIR, ΔJR, ΔKR) are negligible. In such case, the following equation (11)″ may be used in place of the equation (11). The equation (11)″ is obtained by deleting the transformation matrix including (ΔXR, ΔYR, ΔZR) and (ΔIR, ΔJR, ΔKR) on the right side of the equation (11).

$$\begin{bmatrix} Tpx' \\ Tpy' \\ Tpz' \\ 1 \end{bmatrix} = \begin{bmatrix} 1 & \Delta KL & -\Delta JL & -\Delta XL \\ -\Delta KL & 1 & \Delta IL & -\Delta YL \\ \Delta JL & -\Delta IL & 1 & -\Delta ZL \\ 0 & 0 & 0 & 1 \end{bmatrix} \begin{bmatrix} Tpz \\ Tpy \\ Tpz \\ 1 \end{bmatrix} \quad (11)''$$

Based on the tool end point vector Tp(Tpx, Tpy, Tpz) and the actual tool end point vector Tp'(Tpx', Tpy', Tpz') derived from equation (12), a translational/rotational compensation amount Δ3D (Δ3Dx, Δ3Dy, Δ3Dz) for use in correcting the tool end point to an accurate position as seen from the table is calculated in accordance with equation (13).

$$\begin{bmatrix} \Delta 3Dx \\ \Delta 3Dy \\ \Delta 3Dz \end{bmatrix} = \begin{bmatrix} Tpx' - Tpx \\ Tpy' - Tpy \\ Tpz' - Tpy \end{bmatrix} \quad (13)$$

The translational/rotational compensation amount Δ3D (Δ3Dx, Δ3Dy, Δ3Dz) thus obtained is added to the command linear axis positions Pml (Pmx, Pmy, Pmz) to thereby determine a modified linear axis position Pml' (Pmx', Pmy', Pmz'). The linear X-, Y- and Z-axes are driven to attain the modified linear axis position Pml' (Pmx', Pmy', Pmz'), and the rotary B- and C-axes are driven to attain the command position, whereby the tool end point position as seen from the table can be moved to the accurate position.

In other words, when the command linear axis position Pml(Pmx, Pmy, Pmz) is given, the table position is normally at a coordinate position (Xa, Ya, Za), but, due to errors, is actually at a coordinate position (Xa″, Ya″, Za″). Thus, compensation is performed using the translational/rotational compensation amount Δ3D (Δ3Dx, Δ3Dy, Δ3Dz) to place the tool head at a position indicated by dotted line in FIG. 11. As a result, the tool end point vector Tp on the table coordinate system Sta (Xa, Ya, Za) is brought to coincide with the actual tool end point vector Tpa on the actual table coordinate system Sta″ (Xa″, Ya″, Za″). This indicates that the tool end point position as seen from the actual table or the workpiece is moved to the accurate position.

The setting of compensation amounts and the construction of the numerical controller are the same as the setting of compensation amount in FIGS. 3 to 6 and the numerical control shown by block diagrams in FIGS. 7 to 9, which are already described with regard to the tool head rotary type five-axis machining apparatus in FIG. 1. It should be noted that in the block diagrams in FIGS. 7 to 9, the tool length compensation vector which is the input to the compensation means should be changed to the tool end point vector.

In this embodiment, the calculation is performed on the basis of the relation that the errors and the compensation amounts are opposite to one another in positive and negative signs according to the embodiment of the five-axis machining apparatus of the tool head rotary type. However, the calculation may be performed on the basis of the relation that the errors and the compensation amounts with respect to the table are the same in the same signs. In the case where the compensation amounts are regard as amounts to compensate the errors of the table with the position of the table, the relation between the errors and the compensation amounts is opposite. In the case where the compensation amounts are regard as amounts to compensate the errors of the table by the position of the tool, the relation between the errors and the compensation amounts is the same. In the latter case, negative signs of the errors −ΔIn, −ΔJn, and −ΔKn (n=L or R) and the errors −ΔXn, −ΔYn, and −ΔZn (n=L or R) are deleted and the signs of respective elements corresponding to these errors are reversed in the equations (11) and (12) and in FIG. 11. For these errors with respect to the table, vectors identical to the errors at respective lattice points are used as the lattice point compensation vectors.

Figure 12:
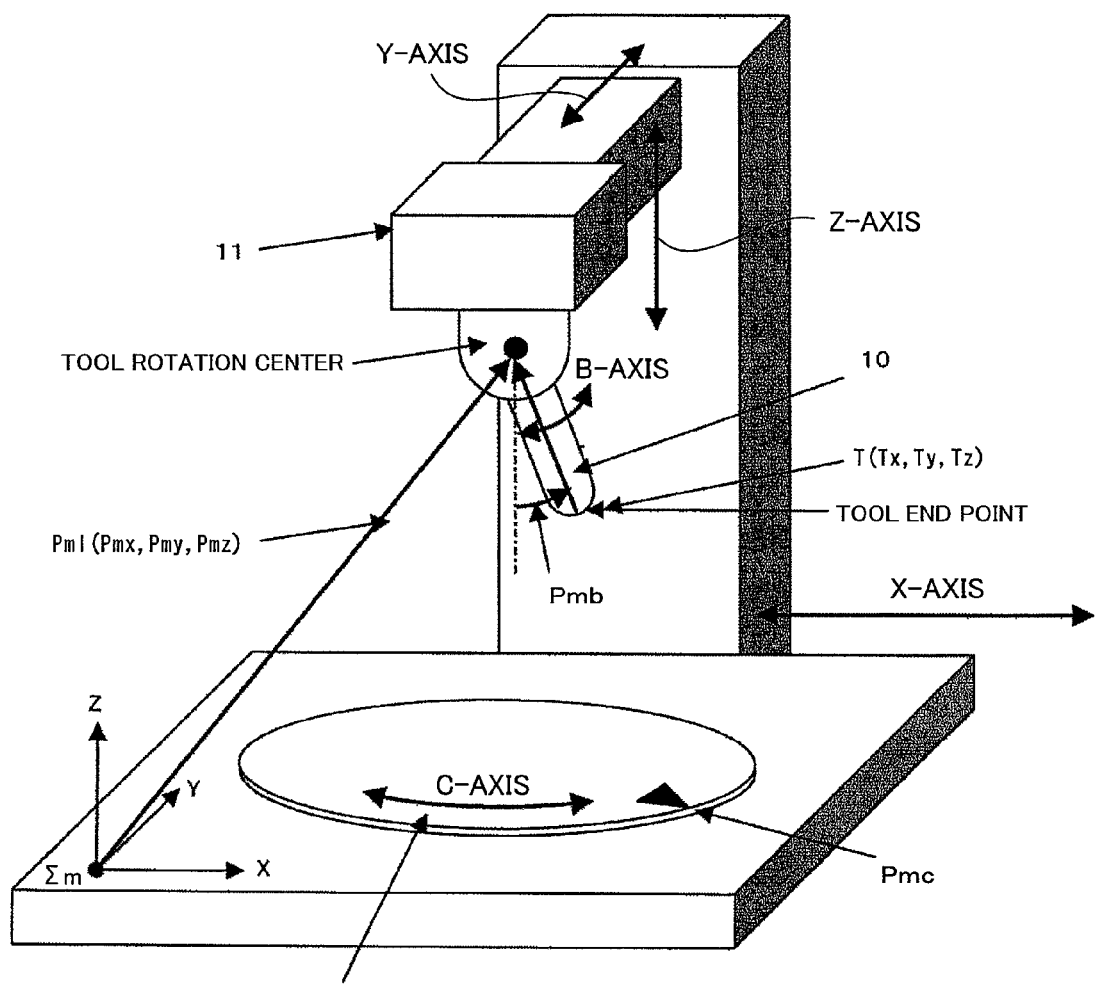
FIG. 12 is a conceptual view showing an example of a mixed type machine (having a tool head and a table both of which are rotatable)

FIG. 12 shows an example of a mixed type machine (having a tool head and a table which are rotatable). The tool 10 is adapted to rotate with rotation of B-axis. The tool head 11 is linearly movable along the Z-axis in the vertical direction. The table 12 rotates with rotation of the C-axis.

Figure 13:
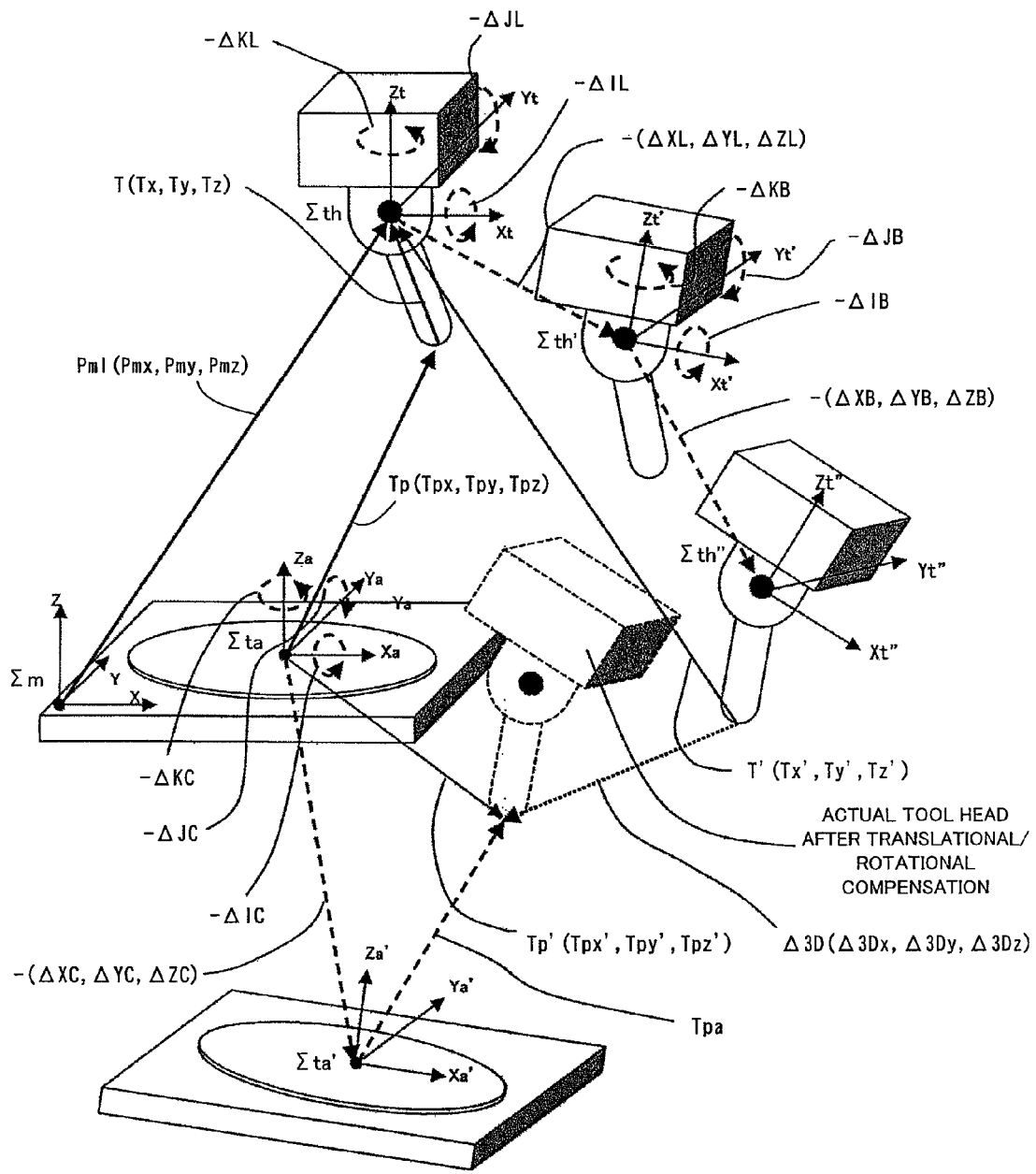
FIG. 13 is a view showing rotational and translational errors and compensation of these in this invention.

Next, with reference to FIG. 13, a description will be given of rotational and translational errors and compensation of these in a five-axis machining apparatus, which is a mixed type machine (in which both the tool head and the table are rotatable). There is shown a tool head coordinate system Sth (Xt, Yt, Zt) having the origin thereof coincident with the tool head rotary center. As illustrated, due to a linear axis-dependent translational error and a linear axis-dependent rotational error, the tool head coordinate system Sth is shifted to a coordinate system Sth' (Xt', Yt', Zt'), which is further shifted to a coordinate system Sth″ (Xt″, Yt″, Zt″) due to B-axis-dependent translational and rotational errors. Symbols −ΔIn, −ΔJn, and −ΔKn (n=L or B) indicate the rotational error between corresponding two of the coordinate systems around the X-, Y-, and Z-axes. Symbols −ΔXn, −ΔYn, and −ΔZn (n=L or B) denote the translational error between corresponding two of the coordinate systems in the X-axis, Y-axis, and Z-axis directions. As illustrated, the table coordinate system Sta (Xa, Ya, Za) having the origin thereof coincident with the table rotation center is shifted to a coordinate system Sta' (Xa', Ya', Za') due to C-axis-dependent translational and rotational errors. Symbols −ΔXC, −ΔYC, and −ΔZC denote the translational error between the coordinate systems in the X-axis, Y-axis, and Z-axis directions, and symbols −ΔIC, −ΔJC, and −ΔKC denote the rotational error between the coordinate systems in the X-axis, Y-axis, and Z-axis directions. These errors are small in amount, but are exaggerated in FIG. 13 for ease of understanding.

A linear axis-dependent translational compensation amount for a command linear axis position Pml(Pmx, Pmy, Pmz) is represented by ΔXL, ΔYL, and ΔZL, and a linear axis-dependent rotational compensation amount for the Pml is represented by ΔIL, ΔJL, and ΔKL. A B-axis-dependent translational compensation amount for a command B-axis position Pmb is represented by ΔXB, ΔYB, and ΔZB, and a B-axis-dependent rotational compensation amounts for the Pmb is represented by ΔIB, ΔJB, and ΔKB. The above compensation amounts are referred to as axis-dependent translational compensation amounts and axis-dependent rotational compensation amounts. A C-axis-dependent translational compensation amount for a command C-axis position Pmc is represented by ΔXC, ΔYC, and ΔZC, and a C-axis-dependent rotational compensation amount for the Pmc is represented by ΔIC, ΔJC, and ΔKC. Since the errors and the compensation amounts are opposite to one another in positive and negative signs, the errors are represented by the negatives of the compensation amounts in the drawings and the present specification. As indicated by equations (14) and (15), an actual tool end point vector Tp'(Tpx', Tpy', Tpz') and an actual tool length compensation vector T'(Tx', Ty', Tz') can be determined by multiplying a tool end point vector Tp(Tpx, Tpy, Tpz), which is a vector extending from the table rotation center to the tool end point, and a tool length compensation vector T(Tx, Ty, Tz), which is a vector extending from the tool end point to the tool head rotary center, by transformation matrices corresponding to respective ones of the errors. The way of determining the tool end point vector Tp is the same as that in the second example. In equations (14) and (15), matrix elements ΔIL, ΔJL, ΔKL, ΔIB, ΔJB, ΔKB, ΔIC, ΔJC, and ΔKC are in radian. A method for approximation is similar to that for equation (1).

$$\begin{bmatrix} Tpx' \\ Tpy' \\ Tpz' \\ 1 \end{bmatrix} = \begin{bmatrix} 1 & \Delta KC & -\Delta JC & -\Delta XC \\ -\Delta KC & 1 & \Delta IC & -\Delta YC \\ \Delta JC & -\Delta IC & 1 & -\Delta ZC \\ 0 & 0 & 0 & 1 \end{bmatrix} \begin{bmatrix} Tpx \\ Tpy \\ Tpz \\ 1 \end{bmatrix} \quad (14)$$

$$\begin{bmatrix} Tx' \\ Ty' \\ Tz' \\ 1 \end{bmatrix} = \begin{bmatrix} 1 & \Delta KL & -\Delta JL & -\Delta XL \\ -\Delta KL & 1 & \Delta IL & -\Delta YL \\ \Delta JL & -\Delta IL & 1 & -\Delta ZL \\ 0 & 0 & 0 & 1 \end{bmatrix} \begin{bmatrix} 1 & \Delta KB & -\Delta JB & -\Delta XB \\ -\Delta KB & 1 & \Delta IB & -\Delta YB \\ \Delta JB & -\Delta IB & 1 & -\Delta ZB \\ 0 & 0 & 0 & 1 \end{bmatrix} \begin{bmatrix} -Tx \\ -Ty \\ -Tz \\ 1 \end{bmatrix} \quad (15)$$

From equation (15), equation (16) given below can be derived, in which the terms of the second power of the error in the product of the transformation matrices are neglected.

$$\begin{bmatrix} -Tx' \\ -Ty' \\ -Tz' \\ 1 \end{bmatrix} = \begin{bmatrix} 1 & \Delta KL + \Delta KB & -\Delta JL - \Delta JB & -\Delta XL - \Delta XB \\ -\Delta KL - \Delta KB & 1 & \Delta IL + \Delta IB & -\Delta YL - \Delta YB \\ \Delta JL + \Delta JB & -\Delta IL - \Delta IB & 1 & -\Delta ZL - \Delta ZB \\ 0 & 0 & 0 & 1 \end{bmatrix} \begin{bmatrix} -Tx \\ -Ty \\ -Tz \\ 1 \end{bmatrix} \quad (16)$$

There is a case where the B axis-dependent translational compensation amount (ΔXB, ΔYB, ΔZB) and the B axis-dependent rotational compensation amount (ΔIB, ΔJB, ΔKB) for the command B-axis position Pmb are more significant than the linear axis-dependent translational compensation amount (ΔXL, ΔYL, ΔZL) and the linear axis-dependent rotational compensation amount (ΔIL, ΔJL, ΔKL) for the command linear axis position Pml, and the linear axis-dependent translational compensation amount (ΔXL, ΔYL, ΔZL) and the linear axis-dependent rotational compensation amount (ΔIL, ΔJL, ΔKL) are negligible. In such case, the following equation (15)' may be used in place of the equation (15). The equation (15)' is obtained by deleting the transformation matrix including (ΔXL, ΔYL, ΔZL) and (ΔIL, ΔJL, ΔKL) on the right side of the equation (15).

$$\begin{bmatrix} -Tx' \\ -Ty' \\ -Tz' \\ 1 \end{bmatrix} = \begin{bmatrix} 1 & \Delta KB & -\Delta JB & -\Delta XB \\ -\Delta KB & 1 & \Delta IB & -\Delta YB \\ \Delta JB & -\Delta IB & 1 & -\Delta ZB \\ 0 & 0 & 0 & 1 \end{bmatrix} \begin{bmatrix} -Tx \\ -Ty \\ -Tz \\ 1 \end{bmatrix} \quad (15)'$$

Further, there is a case where the linear axis-dependent translational compensation amount (ΔXL, ΔYL, ΔZL) and the linear axis-dependent rotational compensation amount (ΔIL, ΔJL, ΔKL) for the command linear axis position Pml are more significant than the B axis-dependent translational compensation amount (ΔXR, ΔYR, ΔZR) and the B axis-dependent rotational compensation amount (ΔIR, ΔJR, ΔKR) for the command B-axis position Pmb, and the B axis-dependent translational compensation amount (ΔXR, ΔYR, ΔZR) and the B axis-dependent rotational compensation amount (ΔIR, ΔJR, ΔKR) are negligible. In such case, the following equation (15)" may be used in place of the equation (15). The equation (15)" is obtained by deleting the transformation matrix including (ΔXB, ΔYB, ΔZB) and (ΔIB, ΔJB, ΔKB) on the right side of the equation (15).

$$\begin{bmatrix} -Tx' \\ -Ty' \\ -Tz' \\ 1 \end{bmatrix} = \begin{bmatrix} 1 & \Delta KL & -\Delta JL & -\Delta XL \\ -\Delta KL & 1 & \Delta IL & -\Delta YL \\ \Delta JL & -\Delta IL & 1 & -\Delta ZL \\ 0 & 0 & 0 & 1 \end{bmatrix} \begin{bmatrix} -Tx \\ -Ty \\ -Tz \\ 1 \end{bmatrix} \quad (15)''$$

Based on the vectors Tp, Tp', T, and T', a translational/rotational compensation amount Δ3D(Δ3Dx, Δ3Dy, Δ3Dz) for use in correcting the tool end point to an accurate position as seen from the table is calculated in accordance with equation (17). The above can be derived since a relation of Tp+T−T'+Δ3D−Tp'=0 is fulfilled in FIG. 13.

$$\begin{bmatrix} \Delta 3Dx \\ \Delta 3Dy \\ \Delta 3Dz \end{bmatrix} = \begin{bmatrix} Tpx' - Tpx + Tx' - Tx \\ Tpy' - Tpy + Ty' - Ty \\ Tpz' - Tpz + Tz' - Tz \end{bmatrix} \quad (17)$$

The translational/rotational compensation amount Δ3D (Δ3Dx, Δ3Dy, Δ3Dz) thus obtained is added to the command linear axis positions Pml (Pmx, Pmy, Pmz) to thereby determine a modified linear axis position Pml' (Pmx', Pmy', Pmz'). The linear X-, Y- and Z-axes are driven to attain the modified linear axis position Pml' (Pmx', Pmy', Pmz'), and the rotary B- and C-axes are driven to attain the command position, whereby the tool end point position as seen from the table can be moved to the accurate position.

Specifically, when the command linear axis position Pml (Pmx, Pmy, Pmz) is given, the tool head position is normally at a coordinate position (Xt, Yt, Zt) and the table position is normally at a coordinate position (Xa, Ya, Za). However, due to errors, the actual tool head position is at a coordinate position (Xt", Yt", Zt") and the actual table position is at a coordinate position (Xa', Ya', Za'). Thus, compensation is performed using the translational/rotational compensation amount Δ3D (Δ3Dx, Δ3Dy, Δ3Dz) to place the tool head at a position indicated by dotted line in FIG. 13. As a result, the tool end point vector Tp on the table coordinate system Sta (Xa, Ya, Za) is brought to coincide with the actual tool end point vector Tpa on the actual table coordinate system Sta' (Xa', Ya', Za'). This indicates that the tool end point position as seen from the actual table or the workpiece is moved to the accurate position.

The setting of compensation amounts and the construction of the numerical controller are the same as the setting of compensation amount in FIGS. 3 to 6 and the numerical control shown by block diagrams in FIGS. 7 to 9, which are already described with regard to the tool head rotary type five-axis machining apparatus shown in FIG. 1. It should be noted that in the block diagrams in FIGS. 7 to 9, the information on the tool end point vector is inputted to the compensation means in addition to the information on the tool length compensation vector.

In this embodiment, the calculation is performed on the basis of the relation that the errors and the compensation amounts are opposite to one another in positive and negative signs according to the embodiment of the five-axis machining apparatus of the tool head rotary type. However, the calculation may be performed on the basis of the relation that the errors and the compensation amounts with respect to the table are the same in the same signs. In the case where the compensation amounts are regard as amounts to compensate the errors of the table with the position of the table, the relation between the errors and the compensation amounts is opposite. In the case where the compensation amounts are regard as amounts to compensate the errors of the table by the position of the tool, the relation between the errors and the compensation amounts is the same. In the latter case, negative signs of the errors −ΔXC, −ΔYC, −ΔZC, −ΔIC, −ΔJC and −ΔKC are deleted and the signs of respective elements corresponding to these errors are reversed in the equation (14) and in FIG. 13.

For the C-axis dependent translational and rotational compensation amounts, vectors identical to the errors at respective lattice points are used as the lattice point compensation vectors.

The following is a description of the setting and calculation of compensation amounts. A linear axis-dependent translational compensation amount (ΔXL, ΔYL, ΔZL) for a command linear axis position Pml(Pmx, Pmy, Pmz) and a linear axis-dependent rotational compensation amount (ΔIL, ΔJL, ΔKL) for the Pml are the same as those in the exemplar tool head rotary type five-axis machining apparatus. On the other hand, a B-axis-dependent translational compensation amount (ΔXB, ΔYB, ΔZB) and a B-axis-dependent rotational compensation amount (ΔIB, ΔJB, ΔKB) for a command B-axis position Pmb, and a C-axis-dependent translational compensation amount (ΔXC, ΔYC, ΔZC) and a C-axis-dependent rotational compensation amount (ΔIC, ΔJC, ΔKC) for a command C-axis position Pmc are different from those in the exemplar tool head rotary type five-axis machining apparatus. These differences are caused by the reason that correlation between the B- and C-axes is not as strong in the exemplar mixed type five-axis machining apparatus as in the exemplar tool head rotary type and table rotary type five-axis machining apparatuses.

Figure 14:
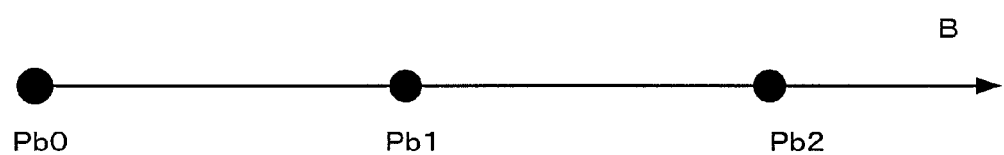
FIG. 14 is a view showing a one-dimensional B-axis coordinate system divided at predetermined intervals.

FIG. 14 shows a one-dimensional B-axis coordinate system divided at predetermined intervals. Symbols Pb0 to Pb2 respectively denote division points arranged at predetermined intervals. It should be noted that a part of the coordinate system is shown in FIG. 14, and actually, the entire region in which the machine is movable is divided at the predetermined intervals. The division intervals do not have to be constant analogously with the cases shown in FIGS. 3 and 5. For instance, the positions of the division points Pr0, Pr1, Pr2 on the B-axis may be individually set by set values.

An error (translational and rotational errors) due to the use of a mechanical system is measured in advance at each division point. As a division point compensation vector, there is used a vector which is equal in absolute value to but opposite in direction from the error. Thus, the compensation amount is represented by a six-dimensional vector Vn(VnX, VnY, VnZ, VnI, VnJ, VnK), where n=0 to 2. The vector components VnX, VnY, and VnZ correspond to the B-axis-dependent translational compensation amount (ΔXB, ΔYB, and ΔZB), and the vector components VnI, VnJ, and VnK correspond to the B-axis-dependent rotational compensation amount (ΔIB, ΔJB, ΔKB). The division point compensation vectors are stored in the form of a B-axis-dependent compensation amount table into a nonvolatile memory or the like.

Figure 15:
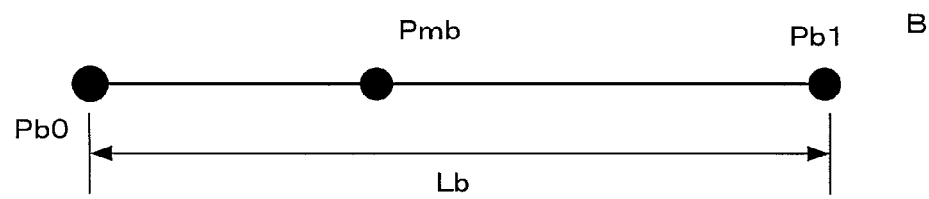
FIG. 15 is a view showing a division region including a command B-axis position Pmb for which a compensation vector should be calculated.

FIG. 15 shows a division region including a command B-axis position Pmb for which a compensation vector should be calculated. In this example, the command B-axis position Pmb for which a compensation vector should be calculated is in a region surrounded by division points Pb0 and Pb1. Division point compensation vectors V0(V0X, V0Y, V0Z, V0I, V0J, V0K) and V1(V1X, V1Y, V1Z, V1I, V1J, V1K) are respectively set at the division points Pb0 and Pb1. A normalized coordinate value b of the point Pmb is determined in accordance with equation (18) where Lb denotes the interval at which the B-axis is divided.

$$b = (Pmb - Pb0)/Lb \quad (18)$$

Based on the coordinate value b, a B-axis-dependent translational compensation amount (ΔXB, ΔYB, ΔZB) and a B-axis-dependent rotational compensation amount (ΔIB, ΔJB, ΔKB) at the point Pmb are calculated in accordance with equation (19).

$$\Delta aB = V0a \cdot (1-b) + V1a \cdot b \quad (a=X, Y, Z, I, J, K) \quad (19)$$

Figure 16:
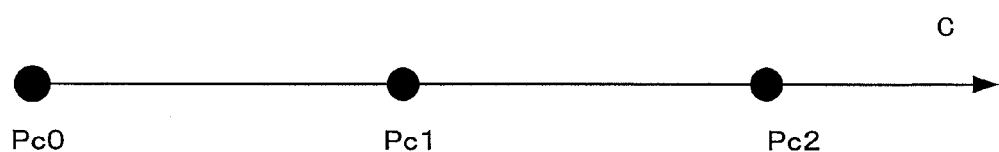
FIG. 16 is a view showing a C-axis coordinate system.

As described above, the compensation vector for the given point Pmb on the B-axis coordinate system can be calculated. In a similar manner, a C-axis-dependent translational compensation amount (ΔXC, ΔYC, ΔZC) and a C-axis-dependent rotational compensation amount (ΔIC, ΔJC, ΔKC) for a given point Pmc on the C-axis coordinate system are calculated from a C-axis-dependent compensation table, which is set as shown in FIG. 16.

The above described compensation with regard to two rotary axes, in which division point compensation vectors for respective one-dimensional coordinate systems are used in combination, can be applied to the first and second examples. In the first to third examples, as the linear axis-dependent compensation amount, there is used the lattice point compensation vector in the three-dimensional coordinate system divided into three-dimensional lattices as shown in FIG. 3. Alternatively, the separation into linear two axes having a strong correlation therebetween and one linear axis having a weak correlation therewith may be made, and compensation may be performed by using a lattice point compensation vector, which is determined for two-dimensional lattices divided as shown in FIG. 5 as a compensation amount dependent on the two linear axes having a strong correlation therebetween, in combination with a division point compensation vector, which is determined for the one-dimensional coordinate system shown in FIG. 14 as a compensation amount dependent on the one linear axis having a weak correlation with the other axes. Further, in these compensation vectors, the division point compensation vectors in the one-dimensional coordinate system do not have to be used, and the compensation may be performed based solely on the lattice point compensation vectors in the two-dimensional lattices.

Furthermore, the compensation for the three linear axes may be made using a combination of division point compensation vectors for respective ones of one-dimensional coordinate systems each as shown in FIG. 14. In this case, the compensation may be made based solely on the division point compensation vectors for any one of the linear axes, or a combination of the division point compensation vectors for any two of the linear axes.

Figure 17:
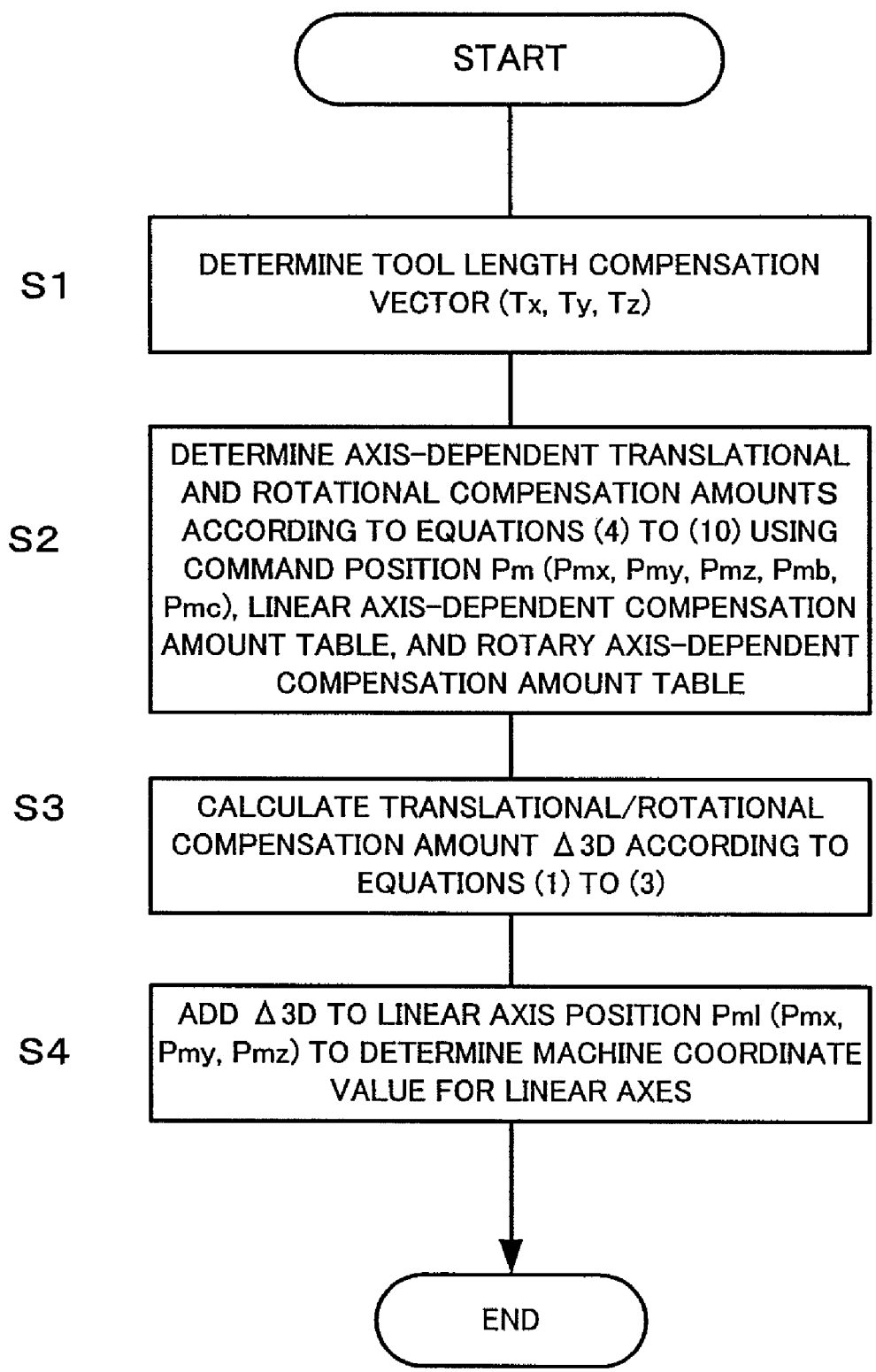
FIG. 17 is a flowchart showing a compensation algorithm implemented in the first embodiment of this invention.

FIG. 17 shows in flowchart a compensation algorithm implemented in the first embodiment of this invention. The following is a description of respective steps. [Step S1] A tool length compensation vector (Tx, Ty, Tz) is determined. [Step S2] Based on the command position Pm(Pmx, Pmy, Pmz, Pmb, Pmc), the linear axis-dependent compensation amount table, and the rotary axis-dependent compensation amount table, axis-dependent translational compensation amounts and axis-dependent rotational compensation amounts are determined according to equations (4) to (10). [Step S3] According to equations (1) to (3), a translational/rotational compensation amount Δ3D is calculated. [Step S4] The compensation amount Δ3D is added to the linear axis position Pml(Pmx, Pmy, Pmz), thereby determining a machine coordinate value to which the linear axes are driven.

Figure 18:
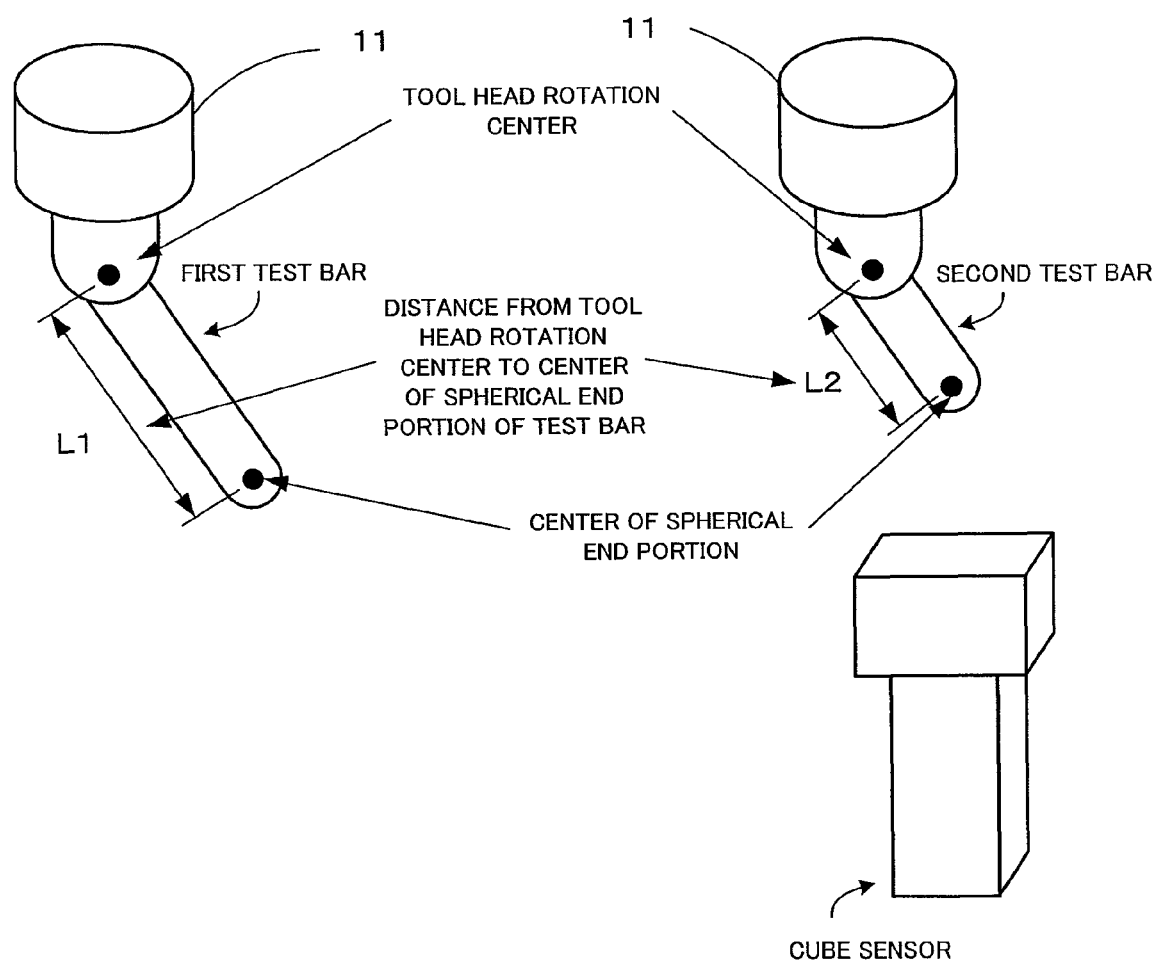
FIG. 18 is a view for explaining a method for determining a linear axis position of a tool head rotary center.

The following is a description of an exemplar method for measuring the rotational and translational errors at a given rotary axis position in the above described tool head rotary type five-axis machining apparatus. Specifically, an error amount is measured, which corresponds to a lattice point compensation vector at a given one of the B- and C-axis positions in FIG. 5. It is assumed here that there are no linear-axis-dependent rotational and translational errors. As shown in FIG. 18, two test bars are adapted to be mounted to the tool head 11 instead of mounting the tool 10. The radius of a spherical portion formed at an end of each test bar is known, and a length of each test bar from the rotary center of the tool head to the center of the spherical portion is also known. The length is different between these two test bars. The spherical portion of each test bar is made in contact with a cube sensor fixed to the table, whereby a linear axis machine coordinate value of a measurement point is determined. Here, the measurement point is a linear axis position of the tool head rotary center. The contact is made at a surface of the spherical portion. The measurement point, i.e., the actually measured linear axis position of the tool head rotary center, can be determined on the basis of linear axis machine coordinate values of the tool head rotary center, each of which is measured in a state that the spherical portion is made contact with the cube sensor at one of three or more different points on the surface of the spherical portion. It should be noted that instead of using the test bars, ball end mills each having a semi-spherical shaped end may be used.

Figure 19:
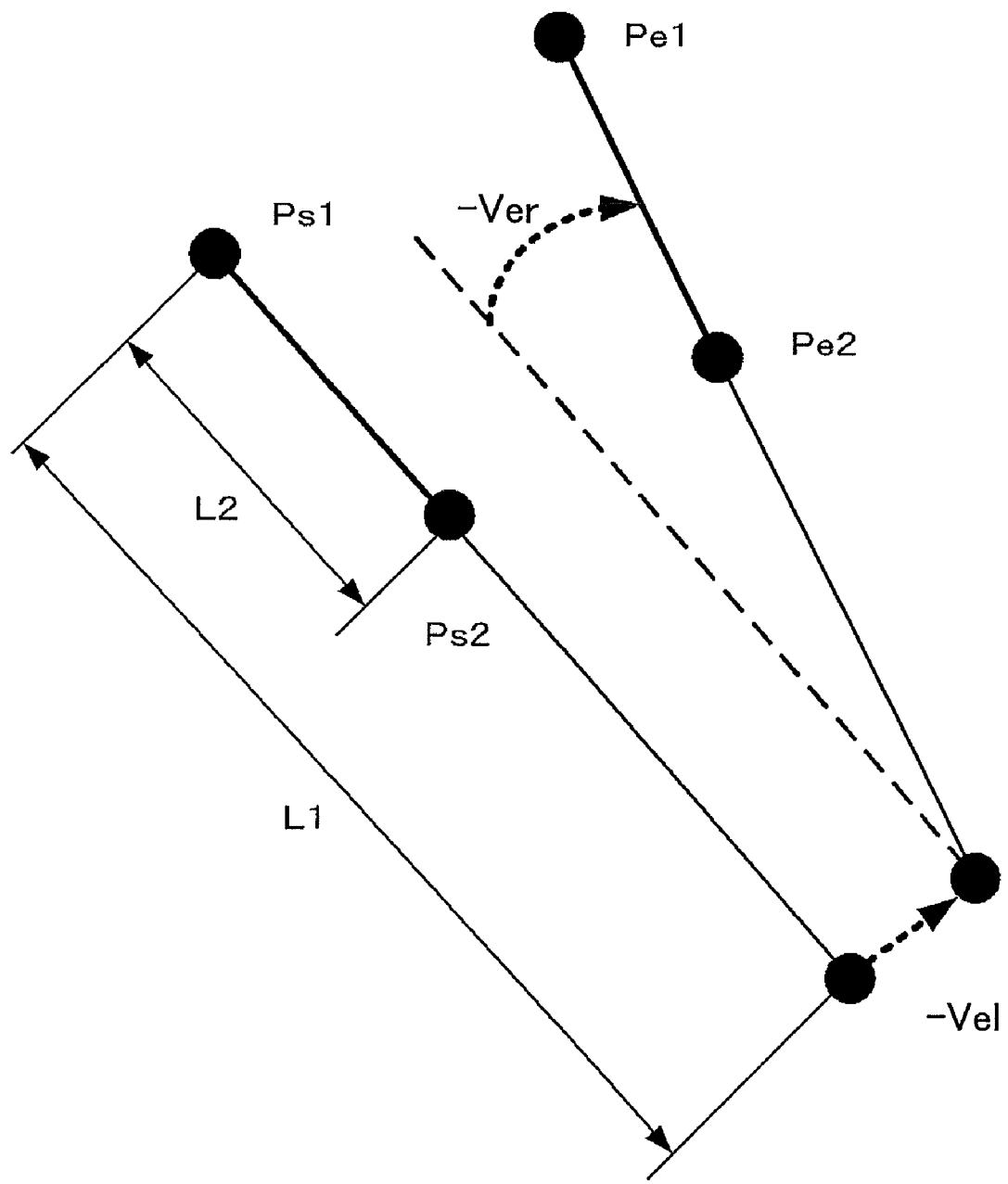
FIG. 19 is a view showing a relation between the linear axis position of the tool head rotary center and translational and rotational errors at a given rotary axis position.

The B- and C-axes are driven to a rotary axis position for measurement, and a linear axis position of the tool head rotary center is measured. It is assumed that in the measurement with the first test bar, the theoretical position or the original position of the measurement point is at Ps1(Ps1x, Ps1y, Ps1z) but the actually measured position is at Pe1(Pe1x, Pe1y, Pe1z), and in the measurement with the second test bar, the theoretical position or the original position of the measurement point is at Ps2(Ps2x, Ps2y, Ps2z) but the actually measured position is at Pe2(Pe2x, Pe2y, Pe2z). A relation between these positions and translational and rotational errors is illustrated in FIG. 19. Differences between Ps1 and Pe1 and between Ps2 and Pe2, which are actually small in amount, but are exaggerated in FIG. 19 for ease of understanding. The theoretical positions Ps1, Ps2 in the measurements using the first and second test bars are calculated on the basis of the position of the cube sensor fixed to the table, the B- and C-axis positions, the radius of the spherical portion of each test bar, and the lengths L1, L2 of the test bars.

The translational error, −Vel(−VeX, −VeY, −VeZ), is determined in accordance with equation (20). This translational error is equivalent to the negatives of the vector components VnX, VnY, and VnZ of the six-dimensional vector Vn(VnX, VnY, VnZ, VnI, VnJ, VnK) of the above described compensation amount.

$$-Vel = \frac{L1}{L2}\{(Pe2 - Pe1) - (Ps2 - Ps1)\} + Pe1 - Ps1 \qquad (20)$$

The rotational error, −Ver(−VeI, −VeJ, −VeK), can be determined by solving the following equation. This rotational error is equivalent to the negatives of the vector components VnI, VnJ, and Vnk of the six-dimensional vector Vn(VnX, VnY, VnZ, VnI, VnJ, VnK) of the above described compensation amount. As in equation (1), etc., with the assumption that the rotational error, −Ver(−VeI, −VeJ, −VeK), is sufficiently small, transformation matrix elements are each represented by an approximation of a trigonometric function. It should be noted that trigonometric functions may be used in the transformation matrices instead of using approximations thereof.

$$\begin{bmatrix} Pe1x - Pe2x \\ Pe1y - Pe2y \\ Pe1z - Pe2z \end{bmatrix} = \begin{bmatrix} 1 & VeK & -VeJ \\ -VeK & 1 & VeI \\ VeJ & -VeI & 1 \end{bmatrix} \begin{bmatrix} Ps1x - Ps2x \\ Ps1y - Ps2y \\ Ps1z - Ps2z \end{bmatrix} \qquad (21)$$

Since the error and the compensation amount are opposite to one another in positive and negative signs, the negative of the error is stored as one of the lattice point compensation vectors at the lattice points in FIG. 5. In the above, the example has been described, in which lattice point compensation vectors at lattice points on two axes in FIG. 5 are determined. This example can also be applied to one axis, in which division point compensation vectors on one axis in FIG. 14 or 16 are used. Such a modification can easily be realized, and therefore a description thereof is omitted herein.

Figure 20:
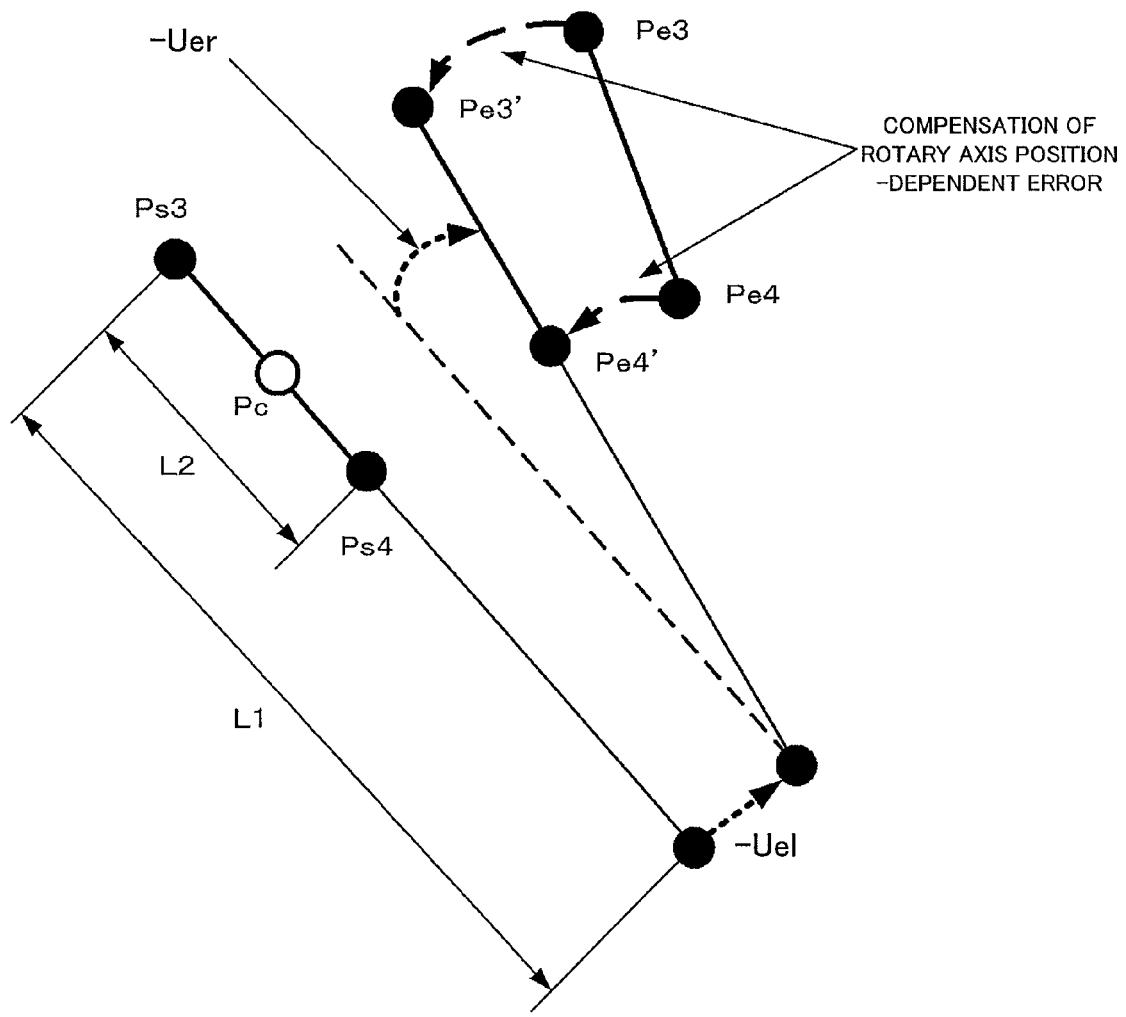
FIG. 20 is a view showing a relation between the linear axis position of the tool head rotary center and translational and rotational errors at a given linear axis position.

In the following, a description will be given of an example of a method for measuring rotational and translational errors at a given linear axis position in the above described tool head rotary type five-axis machining apparatus. Specifically, an error amount is measured, which corresponds to one of lattice point compensation vectors at X-, Y-, and Z-axis positions in FIG. 3. Test bars are the same as those shown in FIG. 18. The B- and C-axes are driven to a given position, and a linear axis position of the tool head rotary center is measured. It is assumed that in the measurement with the first test bar, the theoretical position or the original position of the measurement point is at Ps3(Ps3x, Ps3y, Ps3z) but the actually measured position is at Pe3(Pe3x, Pe3y, Pe3z), and in the measurement with the second test bar, the theoretical position or the original position of the measurement point is at Ps4(Ps4x, Ps4y, Ps4z) but the actually measured position is at Pe4(Pe4x, Pe4y, Pe4z). A middle point between Ps3 and Ps4 is represented by Pc. A relation between these positions and translational and rotational errors is shown in FIG. 20. Differences between Ps3 and Pe3 and between Ps4 and Pe4 are actually small in amount, but are exaggerated in FIG. 20 for ease of understanding.

The rotary axis position-dependent error at the B- and C-axis position is already measured and known, and compensation for compensating the error is performed. It is assumed that an actually measured position obtained by correcting the position Pe3 is represented by Pe3'(Pe3x', Pe3y', Pe3z'), and an actually measured position obtained by correcting the position Pe4 is represented by Pe4'(Pe4x', Pe4y', Pe4z'). By applying Ps3, Ps4, Pe3', and Pe4' instead of Ps1, Ps2, Pe1, and Pe2, to equations (20) and (21), a linear axis position-dependent translational error, −Uel(−UeX, −UeY, −UeZ), and a linear axis position-dependent rotational error, −Uer(−UeI, −UeJ, −UeK), can be determined instead of −Vel and −Ver. The negatives of these errors are equivalent to the already mentioned compensation amount, i.e., the six-dimensional vector Un(UnX, UnY, UnZ, UnI, UnJ, UnK). The negatives of the errors are stored as a lattice point compensation vector at a corresponding one of lattice points in FIG. 3.

What is claimed is:

1. A numerical controller for controlling a five-axis machining apparatus provided with three linear axes and two rotary axes for moving a tool relative to a workpiece mounted on a table, according to commands of a machining program, said numerical controller comprising:
   axis-dependent compensation amount calculating means that calculates an axis-dependent translational compensation amount and an axis-dependent rotational compensation amount for a command axis position;
   translational/rotational compensation amount calculating means that calculates a translational/rotational compensation amount based on the axis-dependent translational compensation amount and the axis-dependent rotational compensation amount;
   compensation amount adding means that adds the calculated translational/rotational compensation amount to a command linear-axis position to obtain a compensated linear-axis position; and
   means that drives the three linear axes to the compensated linear-axis position and drives the two rotary axes to command positions.

2. A numerical controller according to claim 1, wherein said axis-dependent compensation amount calculating means calculates a rotary axis-dependent translational compensation amount and a rotary axis-dependent rotational compensation amount for a command rotary-axis position, and said translational/rotational compensation amount calculating means calculates the translational/rotational compensation amount based on the rotary axis-dependent translational compensation amount and the rotary axis-dependent rotational compensation amount.

3. A numerical controller according to claim 1, wherein said axis-dependent compensation amount calculating means calculates a linear axis-dependent translational compensation amount and a linear axis-dependent rotational compensation amount for a command linear-axis position, and said translational/rotational compensation amount calculating means calculates the translational/rotational compensation amount based on the linear axis-dependent translational compensation amount and the linear axis-dependent rotational compensation amount.

4. A numerical controller according to claim 1, wherein said axis-dependent compensation amount calculating means calculates a linear axis-dependent translational compensation amount and a linear axis-dependent rotational compensation amount for a command linear-axis position, and a rotary axis-dependent translational compensation amount and a rotary axis-dependent rotational compensation amount for a command rotary-axis position, and said translational/rotational compensation amount calculating means calculates the translational/rotational compensation amount based on the linear axis-dependent translational compensation amount, the linear axis-dependent rotational compensation amount, the rotary axis-dependent translational compensation amount and the rotary axis-dependent rotational compensation amount.

5. A numerical controller according to claim 1, wherein the two rotary axes are provided for rotating a machining head which supports the tool in the five-axis machining apparatus, and the translational/rotational compensation amount is calculated based on translational/rotational transformation of a tool length compensation vector.

6. A numerical controller according to claim 1, wherein the two rotary axes are provided for rotating the table on which the workpiece is mounted in the five-axis machining apparatus, and the translational/rotational compensation amount is calculated based on translational/rotational transformation of a vector extending from a rotation center of the table to an end point of the tool.

7. A numerical controller according to claim 1, wherein the two rotary axes comprises a first rotary axis for rotating a machining head which supports the tool, and a second rotary axis for rotating the table on which the workpiece is mounted, and the translational/rotational compensation amount is calculated based on translational/rotational transformation of a tool length compensation vector and translational/rotational transformation of a vector extending from a rotation center of the table to an end point of the tool.

8. A numerical controller according to claim 1, wherein said linear axis-dependent compensation amount calculating means divides a three-dimensional coordinate system space defined by the three linear axes into lattice regions arranged at predetermined intervals in respective axis directions, stores a lattice point compensation vector indicative of a rotational compensation amount and a translational compensation amount at each lattice point of the lattice regions, and calculates a linear axis-dependent rotational compensation amount and a linear axis-dependent translational compensation amount at a position on the three linear axes based on lattice point compensation vectors.

9. A numerical controller according to claim 8, wherein the lattice point compensation vectors are determined based on actually measured positions and theoretical positions of measurement points using test bars or ball end mills having different lengths from each other.

10. A numerical controller according to claim 1, wherein said rotary axis-dependent compensation amount calculating means divides a two-dimensional coordinate system space defined by the two rotary axes into lattice regions arranged at predetermined intervals in respective axis directions, stores a lattice point compensation vector indicative of a rotational compensation amount and a translational compensation amount at each lattice point of the lattice regions, and calculates a rotary axis-dependent rotational compensation amount and a rotary axis-dependent translational compensation amount at a position on the two rotary axes based on the lattice point compensation vectors.

11. A numerical controller according to claim 10, wherein the lattice point compensation vectors are determined based on actually measured positions and theoretical positions of measurement points using test bars or ball end mills having different lengths from each other.

12. A numerical controller according to claim 1, wherein said rotary axis-dependent compensation amount calculating means divides a one-dimensional coordinate system space defined by one of the two rotary axes at predetermined intervals, stores a division point compensation vector indicative of a rotational compensation amount and a translational compensation amount at each of division points arranged at the predetermined intervals, divides a one-dimensional coordinate system space defined by another of the two rotary axes at predetermined intervals, stores a division point compensation vector indicative of a rotational compensation amount and a translational compensation amount at each of division points arranged at the predetermined intervals, and calculates rotary axis-dependent compensation amounts at respective positions on the two rotary axes based on the division point compensation vectors.

13. A numerical controller according to claim 12, wherein the division point compensation vectors are determined based on actually measured positions and theoretical positions of measurement points using test bars or ball end mills having different lengths from each other.

14. A numerical controller according to claim 1, wherein said linear axis-dependent compensation amount calculating means divides a two-dimensional coordinate system space defined by two of said three linear axes into lattice regions arranged at predetermined intervals in respective axis directions, stores a lattice point compensation vector indicative of a rotational compensation amount and a translational compensation amount at each lattice point of the lattice regions, calculates a linear axis-dependent rotational compensation amount and a linear axis-dependent translational compensation amounts at a position on the two linear axes based on the lattice point compensation vectors, divides a one-dimensional coordinate system space defined by a remaining one of the three linear axes at predetermined intervals, stores a division point compensation vector indicative of a rotational compensation amount and a translational compensation amount at each of division points arranged at the predetermined intervals, and calculates a linear axis-dependent rotational compensation amount and a linear axis-dependent translational compensation amount at a position on the remaining one of the three linear axes based on the division point compensation vectors.

15. A numerical controller according to claim 14, wherein the lattice point compensation vectors and the division point compensation vectors are determined based on actually measured positions and theoretical positions of measurement points using test bars or ball end mills having different lengths from each other.

16. A numerical controller according to claim 1, wherein said linear axis-dependent compensation amount calculating means divides each of one-dimensional coordinate system spaces defined by respective ones of the three linear axes at predetermined intervals, stores a division point compensation vector indicative of a rotational compensation amount and a translational compensation amount at each of division points arranged at the predetermined intervals, and calculates linear axis-dependent compensation amounts at positions on the respective ones of the three linear axes based on the division point compensation vectors.

17. A numerical controller according to claim 16, wherein the division point compensation vectors are determined based on actually measured positions and theoretical positions of measurement points using test bars or ball end mills having different lengths from each other.

18. A numerical controller according to claim 1, wherein the command axis position is an interpolated one of an axis position of the three linear axes or an axis position of the two rotary axes respectively commanded by the machining program.

19. A numerical controller according to claim 1, wherein the command axis position is an axis position of the three linear axes or an axis position of the two rotary axes respectively commanded by the machining program.

* * * * *